US011361255B2

(12) United States Patent
Parker et al.

(10) Patent No.: US 11,361,255 B2
(45) Date of Patent: Jun. 14, 2022

(54) ANALYTIC SYSTEM FOR INTERACTIVE GRAPHICAL MODEL SELECTION BASED ON WAVELET COEFFICIENTS

(71) Applicant: SAS Institute Inc., Cary, NC (US)

(72) Inventors: Ryan Jeremy Parker, Raleigh, NC (US); Clayton Adam Barker, Cary, NC (US); Jeremy Ryan Ash, Raleigh, NC (US); Christopher Michael Gotwalt, Raleigh, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 17/387,135

(22) Filed: Jul. 28, 2021

(65) Prior Publication Data

US 2021/0365842 A1 Nov. 25, 2021

Related U.S. Application Data

(63) Continuation-in-part of application No. 17/158,062, filed on Jan. 26, 2021, now Pat. No. 11,100,395, and (Continued)

(51) Int. Cl.

*G06N 20/20* (2019.01)
*G06K 9/00* (2022.01)
*G06K 9/62* (2022.01)

(52) U.S. Cl.

CPC .......... *G06N 20/20* (2019.01); *G06K 9/0053* (2013.01); *G06K 9/00516* (2013.01);

(Continued)

(58) Field of Classification Search

CPC .......... G06N 20/20; G06N 20/10; G06N 3/08; G06N 5/003; G06K 9/00516;

(Continued)

(56) References Cited

U.S. PATENT DOCUMENTS

| | | | | |
|---|---|---|---|---|
| 11,100,395 B2 * | 8/2021 | Parker | ..................... | G06F 17/16 |
| 2010/0177103 A1 * | 7/2010 | Grandine | ............... | G06T 17/20 345/442 |
| 2013/0030886 A1 * | 1/2013 | Poortinga | .......... | G06Q 30/0202 705/14.4 |

OTHER PUBLICATIONS

Donoho et al., "Adapting to Unknown Smoothness via Wavelet Shrinkage," Stanford University, Department of Statistics, Jul. 20, 1994.

(Continued)

*Primary Examiner* — Michael J Huntley
*Assistant Examiner* — Imad Kassim
(74) *Attorney, Agent, or Firm* — Bell & Manning, LLC

(57) ABSTRACT

Graphical interactive model selection is provided. A response variable vector for each value of a group variable and an explanatory variable vector are defined. A wavelet function is fit to the explanatory variable vector paired with the response variable vector defined for each value of the group variable. Each fit wavelet function defines coefficients for each value of the group variable. A curve is presented for each value of the group variable and is defined by the plurality of coefficients of an associated fit wavelet function. An indicator is received of a request to perform functional analysis using the coefficients for each value of the of the group variable based on a predefined factor variable. A model is trained using the coefficients for each value of the group variable and a factor variable value associated with each observation vector of each plurality of observation vectors as a model effect.

30 Claims, 18 Drawing Sheets
(2 of 18 Drawing Sheet(s) Filed in Color)

Related U.S. Application Data a continuation-in-part of application No. 16/919,309, filed on Jul. 2, 2020.

(60) Provisional application No. 63/106,473, filed on Oct. 28, 2020, provisional application No. 62/964,906, filed on Jan. 23, 2020, provisional application No. 62/944,130, filed on Dec. 5, 2019.

(52) U.S. Cl.
CPC ......... *G06K 9/6253* (2013.01); *G06K 9/6256* (2013.01); *G06K 9/6296* (2013.01)

(58) Field of Classification Search
CPC .. G06K 9/0053; G06K 9/6253; G06K 9/6256; G06K 9/6296
See application file for complete search history.

(56) References Cited

OTHER PUBLICATIONS

Nason, "Wavelet Methods in Statistics with R," Springer 2008.

* cited by examiner

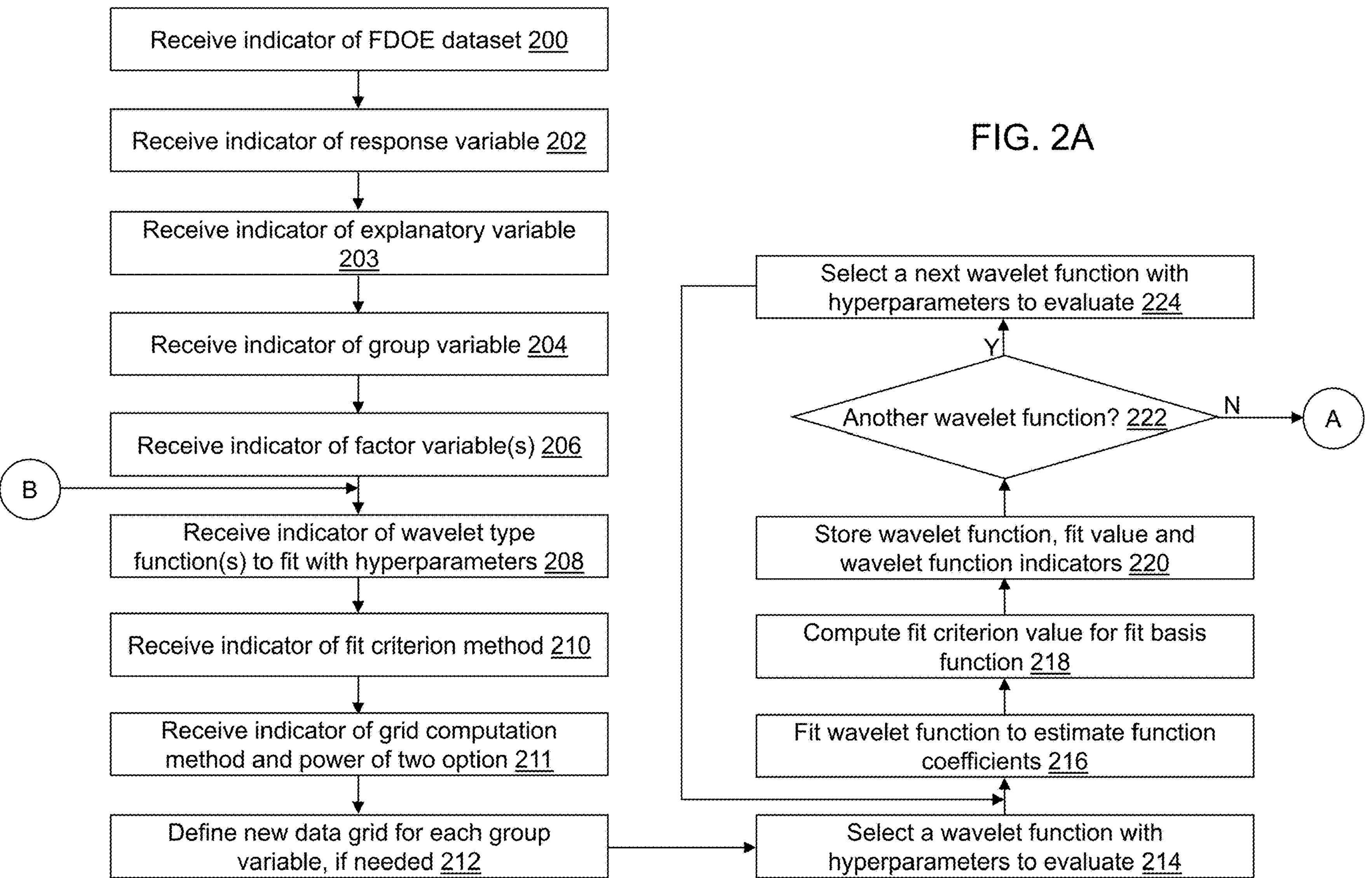
FIG. 2A
Receive indicator of FDOE dataset 200
Receive indicator of response variable 202
Receive indicator of explanatory variable 203
Receive indicator of group variable 204
Receive indicator of factor variable(s) 206
B
Receive indicator of wavelet type function(s) to fit with hyperparameters 208
Receive indicator of fit criterion method 210
Receive indicator of grid computation method and power of two option 211
Define new data grid for each group variable, if needed 212
Select a wavelet function with hyperparameters to evaluate 214
Fit wavelet function to estimate function coefficients 216
Compute fit criterion value for fit basis function 218
Store wavelet function, fit value and wavelet function indicators 220
Another wavelet function? 222
Y
N
A
Select a next wavelet function with hyperparameters to evaluate 224

Model Details

| Model | Wavelet | Parameter | BIC |
|---|---|---|---|
| 1 | Haar | . | 1750 |
| 2 | Symlets | 2 | 1775 |
| 3 | Coiflets | 1 | 1790 |
| 4 | Symlets | 3 | 1850 |
| 5 | Coiflets | 2 | 1990 |

ANALYTIC SYSTEM FOR INTERACTIVE GRAPHICAL MODEL SELECTION BASED ON WAVELET COEFFICIENTS

CROSS-REFERENCE TO RELATED APPLICATIONS

The present application claims the benefit of and priority under 35 U.S.C. § 119(e) to U.S. Provisional Patent Application No. 63/106,473 filed on Oct. 28, 2020, the entire contents of which are hereby incorporated by reference.

The present application is a continuation-in-part of U.S. patent application Ser. No. 17/158,062 that was filed Jan. 26, 2021, the entire contents of which are hereby incorporated by reference. U.S. patent application Ser. No. 17/158,062 claimed the benefit of and priority under 35 U.S.C. § 119(e) to U.S. Provisional Patent Application No. 63/106,473 filed on Oct. 28, 2020.

U.S. patent application Ser. No. 17/158,062 also claimed priority as a continuation-in-part of U.S. patent application Ser. No. 16/919,309. U.S. patent application Ser. No. 16/919,309 claimed priority under 35 U.S.C. § 119(e) to U.S. Provisional Patent Application No. 62/944,110 filed on Dec. 5, 2019, the entire contents of which are hereby incorporated by reference. U.S. patent application Ser. No. 16/919,309 also claimed priority under 35 U.S.C. § 119(e) to U.S. Provisional Patent Application No. 62/964,906 filed on Jan. 23, 2020, the entire contents of which are hereby incorporated by reference.

BACKGROUND

Exploratory analysis benefits from an interactive graphical system that allows the user to easily explore variations. Chemical spectra are often mixture distributions of peaks that correspond to distinct chemical features. These peaks may correspond to chemical constituents in a mixture, as in chromatography data, or individual functional groups, as in nuclear magnetic resonance (NMR) spectroscopy. The chemical changes that it is desired to model often occur on the level of peaks independently. Thus, a model is needed that deconvolutes these spectra into their individual peaks, and then fits a model to the peaks directly.

SUMMARY

In an example embodiment, a non-transitory computer-readable medium is provided having stored thereon computer-readable instructions that, when executed by a computing device, cause the computing device to provide interactive model selection. A dataset is read that includes a plurality of observation vectors defined for each value of a plurality of values of a group variable. Each observation vector of each plurality of observation vectors includes an explanatory variable value of an explanatory variable and a response variable value of a response variable. A response variable vector for each value of the plurality of values of the group variable and an explanatory variable vector are defined from the read dataset. The explanatory variable vector is common to each value of the plurality of values of the group variable. A number of values included in the explanatory variable vector is greater than or equal to a maximum number of observation vectors that are included in the plurality of observation vectors defined for each value of the plurality of values of the group variable. A number of values included in the response variable vector is equal to a number of values included in the explanatory variable vector. A wavelet function is fit to the explanatory variable vector paired with the response variable vector defined for each value of the plurality of values of the group variable. Each fit wavelet function defines a plurality of coefficients for each value of the plurality of values of the group variable. The plurality of coefficients describes a respective response variable vector based on the explanatory variable vector. A curve is presented in a graph for each value of the plurality of values of the group variable. The graph is included within a first sub-window of a first window of a display. Each curve is defined by the plurality of coefficients of an associated fit wavelet function. An indicator is received of a request to perform functional analysis using the plurality of coefficients for each value of the plurality of values of the group variable based on a predefined factor variable. The indicator is received in association with the first window of the display. Each observation vector of each plurality of observation vectors further includes a factor variable value of the predefined factor variable. A model is trained using the plurality of coefficients for each value of the plurality of values of the group variable and the factor variable value associated with each observation vector of each plurality of observation vectors as a model effect. Trained model results are presented from the trained model within a third sub-window of the first window of the display.

In another example embodiment, a computing device is provided. The computing device includes, but is not limited to, a processor and a non-transitory computer-readable medium operably coupled to the processor. The computer-readable medium has instructions stored thereon that, when executed by the computing device, cause the computing device to provide interactive model selection.

In yet another example embodiment, a method of interactive model selection is provided.

Other principal features of the disclosed subject matter will become apparent to those skilled in the art upon review of the following drawings, the detailed description, and the appended claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Illustrative embodiments of the disclosed subject matter will hereafter be described referring to the accompanying drawings, wherein like numerals denote like elements.

FIGS. 2A and 2B depict a flow diagram illustrating examples of operations performed by a model selection application of the model selection device of FIG. 1 in accordance with an illustrative embodiment.

FIG. 3 shows a user interface supported by the model selection application of FIGS. 2A and 2B and used to present a dataset window in accordance with an illustrative embodiment.

FIGS. 6A and 6B show a user interface supported by the model selection application of FIGS. 2A and 2B and used to present fitted wavelet results in accordance with an illustrative embodiment.

DETAILED DESCRIPTION

Figure 1:
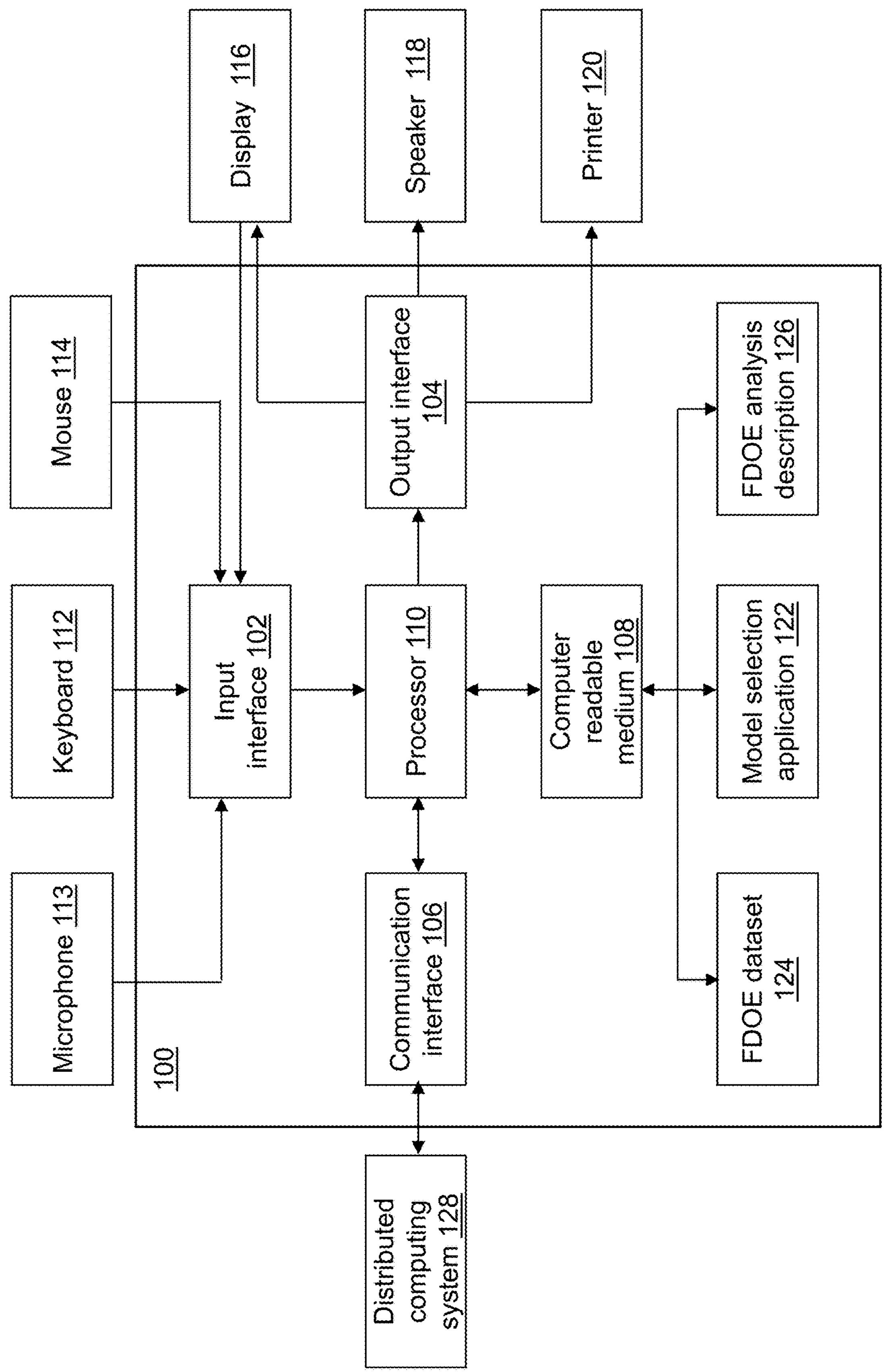
FIG. 1 depicts a block diagram of a model selection device in accordance with an illustrative embodiment.

Referring to FIG. 1, a block diagram of a model selection device 100 is shown in accordance with an illustrative embodiment. Model selection device 100 provides interactive streamlined model selection based on analysis of functional design of experiments (FDOE) data. Model selection device 100 may include an input interface 102, an output interface 104, a communication interface 106, a non-transitory computer-readable medium 108, a processor 110, a model selection application 122, a FDOE dataset 124, and a FDOE analysis description 126. Model selection application 122 provides an interactive and intuitive graphical user interface for users to directly build models that allow them to identify how the data stored in FDOE dataset 124 may impact a functional response. The analytic and model information may be stored in FDOE analysis description 126 for use as a trained model to predict new responses and/or to identify relevant variables for training a model to predict new responses. Fewer, different, and/or additional components may be incorporated into model selection device 100.

A goal of design of experiments (DOE) is to describe and explain a variation of information under conditions hypothesized to reflect a variation in one or more dependent variables, also referred to as output variables or response variables, based on one or more independent variables, also referred to as input variables or explanatory variables. For example, in an experiment to quantify a yield of a manufacturing process, the dependent variable may be the yield, or amount of product produced. This manufacturing process has several variables that can be controlled, such as the heat in the process, or the speed of the process, and these may be the independent variables. The one or more independent variables associated with the one or more dependent variables may further be associated with a group variable that may be defined based on each unique experiment. Using the group variable, the variation associated with the one or more independent variables associated with the one or more dependent variables captures a behavior under one or more experimental conditions.

One or more factor variables further may be evaluated as part of the model selection to determine their effect on the one or more dependent variables. The one or more factor variables may be observed during each experiment. In addition, it is not required that the data come from a pre-designed experiment. FDOE dataset 124 can also come from an observational study that similarly involves one or more independent variables to be associated with one or more dependent variables. For illustration, based on a dataset that includes weekly weather data from a plurality of weather stations around the world, a group variable may be a name of the weather station, dependent variables may include a week of the year, a latitude, a longitude, an elevation, etc., and an independent variable may be a maximum temperature, a minimum temperature, an average temperature, etc.

Model selection application 122 performs operations associated with defining FDOE analysis description 126 from data stored in FDOE dataset 124 and with allowing the user of model selection device 100 to interactively select the model input parameters, also referred to as hyperparameters, based on information presented in display 116. FDOE analysis description 126 may be used to predict a response variable value for data stored in an input dataset 924 (shown referring to FIG. 9) based on a relationship identified between the one or more response variables as a function of the one or more explanatory variables. In the alternative or in addition, FDOE analysis description 126 may be used to indicate one or more variables selected from the one or more explanatory variables and/or the one or more factor variables that are useful in training another predictive model to predict a response variable value for data stored in a training dataset 1124 (shown referring to FIG. 11).

Model selection application 122 is easy to use and provides approximately instantaneous feedback so that the user can quickly and efficiently adjust model parameters. Alternative solutions require the user to store data generated as one part of the analysis for input to another process to perform another part of the analysis, while model selection application 122 allows the user to easily change all or any subset of the data analysis or model design parameters as needed to effectively explore, understand, and model the data stored in FDOE dataset 124.

Input interface 102 provides an interface for receiving information from the user or another device for entry into model selection device 100 as understood by those skilled in the art. Input interface 102 may interface with various input technologies including, but not limited to, a keyboard 112, a microphone 113, a mouse 114, a display 116, a track ball, a keypad, one or more buttons, etc. to allow the user to enter information into model selection device 100 or to make selections presented in a user interface displayed on display 116.

The same interface may support both input interface 102 and output interface 104. For example, display 116 comprising a touch screen provides a mechanism for user input and for presentation of output to the user. Model selection device 100 may have one or more input interfaces that use the same or a different input interface technology. The input interface technology further may be accessible by model selection device 100 through communication interface 106.

Output interface 104 provides an interface for outputting information for review by a user of model selection device 100 and/or for use by another application or device. For example, output interface 104 may interface with various output technologies including, but not limited to, display 116, a speaker 118, a printer 120, etc. Model selection device 100 may have one or more output interfaces that use the same or a different output interface technology. The output interface technology further may be accessible by model selection device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Model selection device 100 may have one or more communication interfaces that use the same or a different communication interface technology. For example, model selection device 100 may support communication using an Ethernet port, a Bluetooth antenna, a telephone jack, a USB port, etc. Data and messages may be transferred between model selection device 100 and another computing device of distributed computing system 128 using communication interface 106.

Computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. model selection device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Model selection device 100 also may have one or more drives that support the loading of a memory media such as a CD, DVD, an external hard drive, etc. One or more external hard drives further may be connected to model selection device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc.

Some processors may be central processing units (CPUs). Some processes may be more efficiently and speedily executed and processed with machine-learning specific processors (e.g., not a generic CPU). Such processors may also provide additional energy savings when compared to generic CPUs. For example, some of these processors can include a graphical processing unit, an application-specific integrated circuit, a field-programmable gate array, an artificial intelligence accelerator, a purpose-built chip architecture for machine learning, and/or some other machine-learning specific processor that implements a machine learning approach using semiconductor (e.g., silicon, gallium arsenide) devices. These processors may also be employed in heterogeneous computing architectures with a number of and a variety of different types of cores, engines, nodes, and/or layers to achieve additional various energy efficiencies, processing speed improvements, data communication speed improvements, and/or data efficiency targets and improvements throughout various parts of the system.

Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Model selection device 100 may include a plurality of processors that use the same or a different processing technology.

Some or all of the operations described herein may be embodied in model selection application 122. The operations may be implemented using hardware, firmware, software, or any combination of these methods. Referring to the example embodiment of FIG. 1, model selection application 122 is implemented in software (comprised of computer-readable and/or computer-executable instructions) stored in computer-readable medium 108 and accessible by processor 110 for execution of the instructions that embody the operations of model selection application 122. Model selection application 122 may be written using one or more programming languages, assembly languages, scripting languages, etc.

Model selection application 122 may be integrated with other analytic tools. As an example, model selection application 122 may be part of an integrated data analytics software application and/or software architecture such as that offered by SAS Institute Inc. of Cary, N.C., USA. For example, model selection application 122 may be integrated with a prediction application 922 (shown referring to FIG. 9) and/or a with a model training application 1122 (shown referring to FIG. 11). Merely for illustration, model selection application 122 may be implemented using or integrated with one or more SAS software tools such as JMP®, Base SAS, SAS® Enterprise Miner™, SAS/STAT®, SAS® High Performance Analytics Server, SAS® Visual Data Mining and Machine Learning, SAS® LASR™, SAS® In-Database Products, SAS® Scalable Performance Data Engine, SAS® Cloud Analytic Services, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, and SAS/IML® all of which are developed and provided by SAS Institute Inc. of Cary, N.C., USA. Data mining, statistical analytics, and response prediction are applicable in a wide variety of industries to solve technical problems.

Model selection application 122 may be implemented as a Web application. For example, model selection application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

FDOE dataset 124 may include, for example, a plurality of rows and a plurality of columns. The plurality of rows may be referred to as observation vectors or records (observations), and the columns may be referred to as variables. In an alternative embodiment, FDOE dataset 124 may be transposed. The plurality of variables may include a response variable y and an explanatory variable x for each observation vector. Input dataset 124 may include additional variables that are not response variable y or explanatory variable x. An $i^{th}$ observation vector may be defined as $(y_i, x_i)$ that may include a value for response variable y and explanatory variable x.

The plurality of variables may further include a group variable g that separately identifies each experiment as well as one or more factor variables f. Based on this, an observation vector may be defined as $(y_i, x_i, g_i, f_i)$ that may include a value for the response variable y, a value for the explanatory variable x, a value for the group variable g, and a value for each of the one or more factor variables f associated with an $i^{th}$ observation vector i.

One or more variables of the plurality of variables may describe a characteristic of a physical object. For example, if FDOE dataset 124 includes data related to operation of a vehicle, the variables may include an oil pressure, a speed, a gear indicator, a gas tank level, a tire pressure for each tire, an engine temperature, a radiator level, etc.

FDOE dataset 124 may include data captured as a function of time for one or more physical objects. The data stored in FDOE dataset 124 may be generated by and/or captured from a variety of sources including one or more sensors of the same or different type, one or more computing devices, etc. Data stored in FDOE dataset 124 may be sensor measurements or signal values captured by a sensor, may be generated or captured in response to occurrence of an event or a transaction, generated by a device such as in response to an interaction by a user with the device, etc. For example, in data science, engineering, and statistical applications, data often consists of multiple measurements (across sensors, characteristics, responses, etc.) collected across multiple time instances (patients, test subjects, experiments, geographic locations, etc.). These measurements may be collected in FDOE dataset 124 for analysis and processing. The data stored in FDOE dataset 124 may be captured at different time points periodically, intermittently, when an event occurs, etc. One or more columns of FDOE dataset 124 may include a time and/or a date value.

The data stored in FDOE dataset 124 may be received directly or indirectly from the source and may or may not be pre-processed in some manner. For example, the data may be pre-processed using an event stream processor such as the SAS® Event Stream Processing Engine (ESPE), developed and provided by SAS Institute Inc. of Cary, N.C., USA.

FDOE dataset 124 may include data captured at a high data rate such as 200 or more observation vectors per second for one or more physical objects of the same or different type. For example, data stored in FDOE dataset 124 may be generated as part of the Internet of Things (IoT), where things (e.g., machines, devices, phones, sensors) can be connected to networks and the data from these things collected and processed within the things and/or external to the things before being stored in FDOE dataset 124. For example, the IoT can include sensors in many different devices and types of devices, and high value analytics can be applied to identify hidden relationships and drive increased efficiencies. This can apply to both big data analytics and real-time analytics. Some of these devices may be referred to as edge devices and may involve edge computing circuitry. These devices may provide a variety of stored or generated data, such as network data or data specific to the network devices themselves. Again, some data may be processed with an ESPE, which may reside in the cloud or in an edge device before being stored in FDOE dataset 124.

The data stored in FDOE dataset 124 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art.

FDOE dataset 124 may be stored using various data structures as known to those skilled in the art including one or more files of a file system, a relational database, one or more tables of a system of tables, a structured query language database, a SAS® dataset, etc. on model selection device 100 or on distributed computing system 128. The data may be organized using delimited fields, such as comma or space separated fields, fixed width fields, etc. The SAS dataset may be a SAS® file stored in a SAS® library that a SAS® software tool creates and processes. The SAS dataset contains data values that are organized as a table of observation vectors (rows) and variables (columns) that can be processed by one or more SAS software tools.

FDOE dataset 124 may be stored on computer-readable medium 108 or on one or more computer-readable media of distributed computing system 128 and accessed by model selection device 100 using communication interface 106, input interface 102, and/or output interface 104. Model selection device 100 may coordinate access to FDOE dataset 124 that is distributed across distributed computing system 128 that may include one or more computing devices. For example, FDOE dataset 124 may be stored in a cube distributed across a grid of computers as understood by a person of skill in the art. As another example, FDOE dataset 124 may be stored in a multi-node Hadoop® cluster. For instance, Apache™ Hadoop® is an open-source software framework for distributed computing supported by the Apache Software Foundation. As another example, FDOE dataset 124 may be stored in a cloud of computers and accessed using cloud computing technologies, as understood by a person of skill in the art. The SAS® LASR™ Analytic Server may be used as an analytic platform to enable multiple users to concurrently access data stored in FDOE dataset 124. The SAS® Viya™ open, cloud-ready, in-memory architecture also may be used as an analytic platform to enable multiple users to concurrently access data stored in FDOE dataset 124. SAS® Cloud Analytic Services (CAS) may be used as an analytic server with associated cloud services in SAS® Viya™. Some systems may use SAS In-Memory Statistics for Hadoop® to read big data once and analyze it several times by persisting it in-memory for the entire session. Some systems may be of other types and configurations.

Figure 2B:
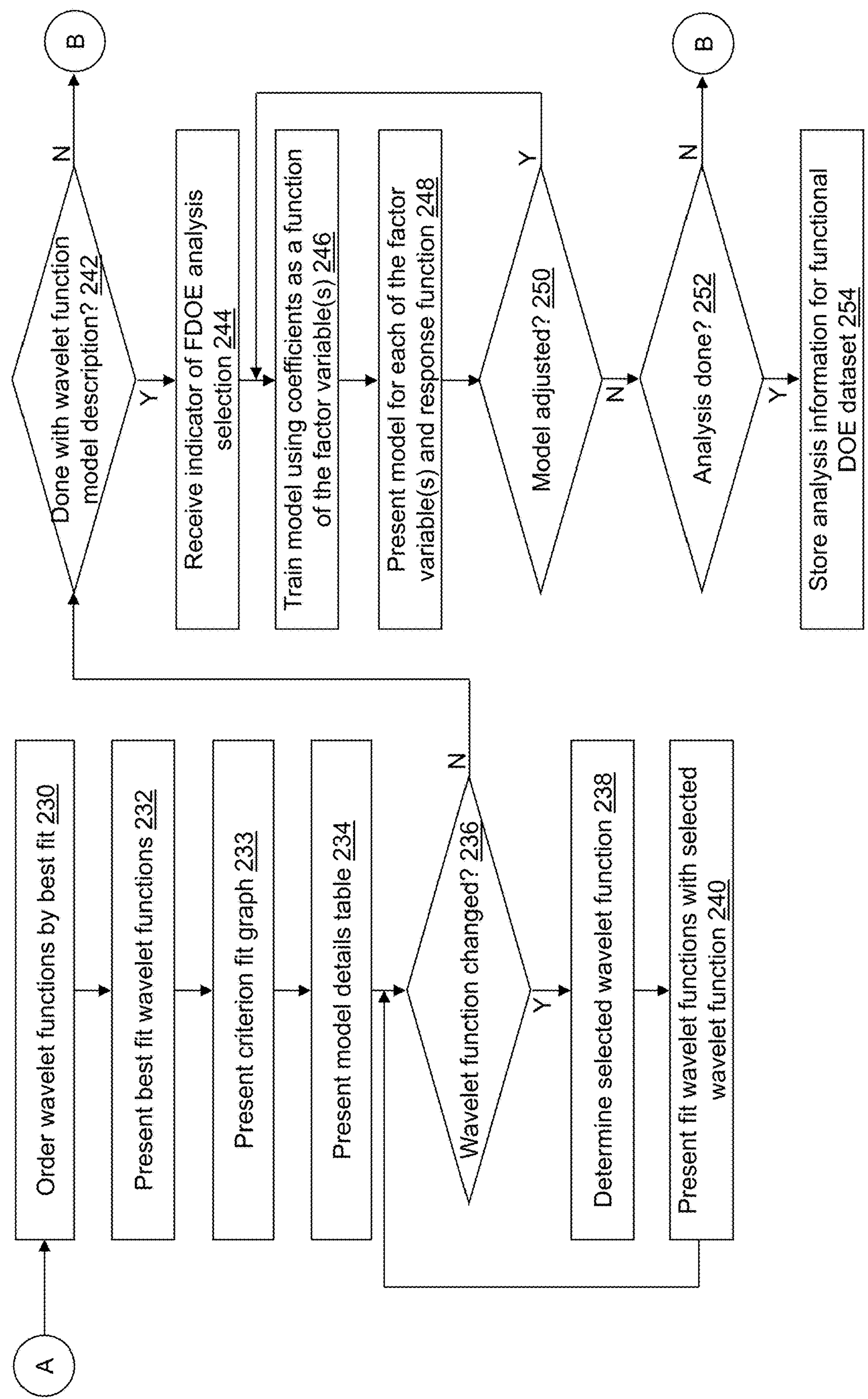

Referring to FIGS. 2A and 2B, example operations associated with model selection application 122 are described. Additional, fewer, or different operations may be performed depending on the embodiment of model selection application 122. The order of presentation of the operations of FIGS. 2A and 2B is not intended to be limiting. Some of the operations may not be performed in some embodiments. Although some of the operational flows are presented in sequence, the various operations may be performed in various repetitions, concurrently (in parallel, for example, using threads and/or distributed computing system 128), and/or in other orders than those that are illustrated. For example, a user may execute model selection application 122, which causes presentation of a first user interface window, which may include a plurality of menus and selectors such as drop-down menus, buttons, text boxes, hyperlinks, etc. associated with model selection application 122 as understood by a person of skill in the art. The plurality of menus and selectors may be accessed in various orders. An indicator may indicate one or more user selections from a user interface, one or more data entries into a data field of the user interface, one or more data items read from computer-readable medium 108 or otherwise defined with one or more default values, etc. that are received as an input by model selection application 122.

Referring to FIG. 2A, in an operation 200, a first indicator may be received that indicates FDOE dataset 124. For example, the first indicator indicates a location and a name of FDOE dataset 124. As an example, the first indicator may be received by model selection application 122 after selection from a user interface window or after entry by a user into a user interface window. In an alternative embodiment, FDOE dataset 124 may not be selectable. For example, a most recently created dataset may be used automatically.

Figure 3:
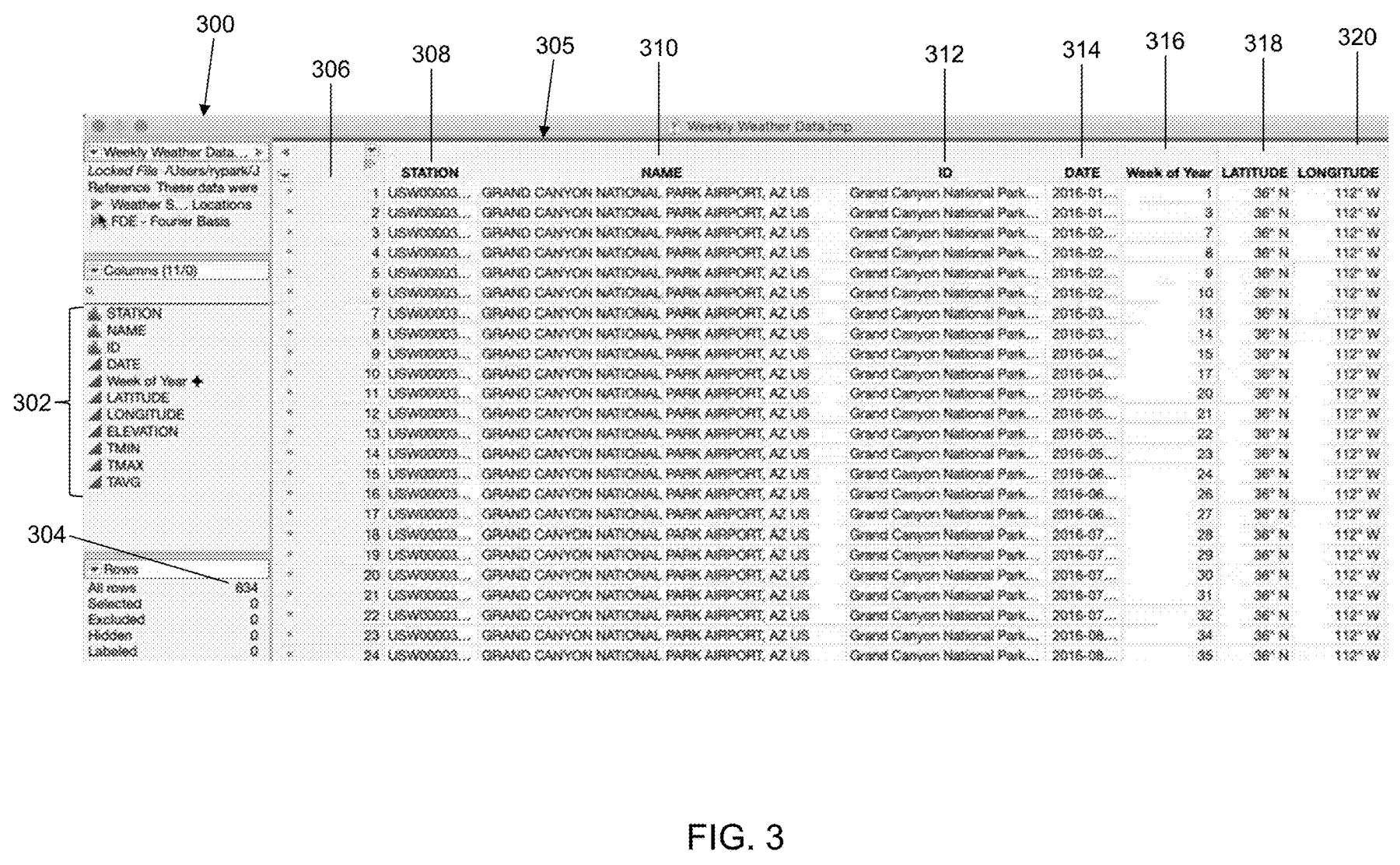

For illustration of a user interface window, referring to FIG. 3, a dataset window 300 is shown in accordance with an illustrative embodiment. Dataset window 300 may include a variable list 302 read from FDOE dataset 124 that is weekly weather data, a number of rows indicator 304 that indicates a number of observation vectors read from FDOE dataset 124, and a data table 305. Variable list 302 may include a list of variables read from FDOE dataset 124 based on a name associated with each column. Data table 305 may include a plurality of columns that each include a data value for each observation vector. In the illustrative embodiment of FIG. 3, data tables 305 includes a row counter column 306, a station column 308, a station name column 310, a station identifier (ID) column 312, a date column 314, a week of the year column 316, a station latitude column 318, a station longitude column 320, etc.

Referring again to FIG. 2A, in an operation 202, a second indicator may be received that indicates response variable y in FDOE dataset 124. For example, the second indicator may indicate a column number or a column name for the response variable y. As another option, a first or a last column of FDOE dataset 124 may be assumed to be the response variable y column.

In an operation 203, a third indicator may be received that indicates the explanatory variable x. For example, the third indicator may indicate a column number or a column name for the explanatory variable x.

In an operation 204, a fourth indicator may be received that indicates group variable g in FDOE dataset 124. For example, the fourth indicator may indicate a column number or a column name for group variable g.

In an operation 206, a fifth indicator may be received that indicates one or more factor variables f in FDOE dataset 124. For example, the fifth indicator may indicate a column number or a column name for each of the one or more factor variables f.

Figure 4:
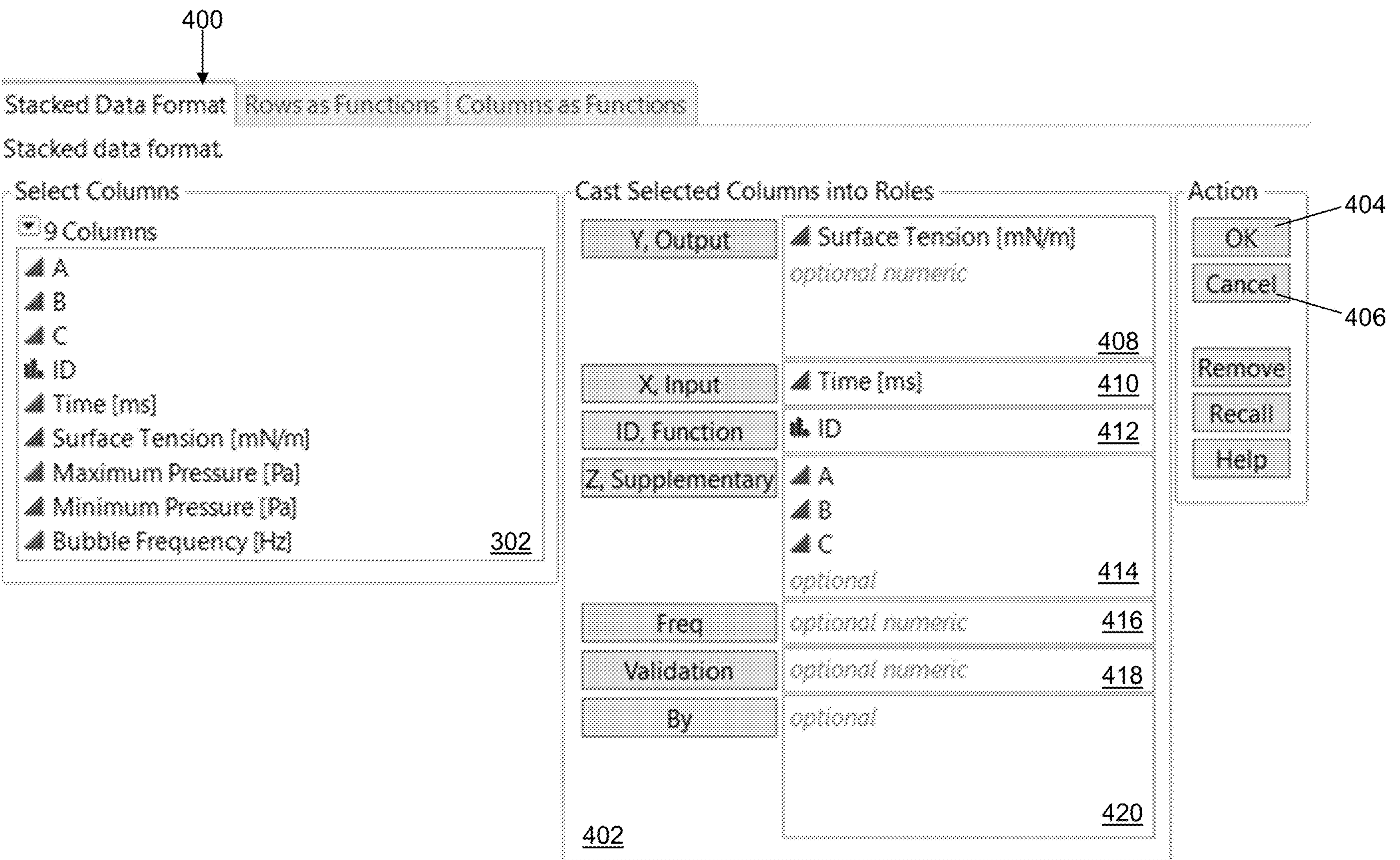
FIG. 4 show a user interface supported by the model selection application of FIGS. 2A and 2B and used to present an input window in accordance with an illustrative embodiment.

For illustration, referring to FIG. 4, an input window 400 is shown in accordance with an illustrative embodiment. Input window 400 may include variable list 302, a role selection section 402, an ok selector 404, and a cancel selector 406. Role selection section 402 of input window 400 can be used to select the response variable using a y-variable selector 408, to select the explanatory variable using an x-variable selector 410, to select group variable g using a group variable selector 412 also indicated as a function variable, and to select the one or more factor variables f using f-variable selector 414.

In the illustrative embodiment, y-variable selector 408 has been used to define the second indicator as having the column name "Surface Tension [mN/m]", x-variable selector 410 has been used to define the third indicator as having the column name "Time", group variable selector 412 further has been used to define the third indicator as having the column name "ID" for group variable g, and f-variable selector 414 has been used to define the fourth indicator as including three variables associated with column names "A", "B", and "C". Group variable g can be used to identify if there is more than one function in FDOE dataset 124. For example, a distinct function may be defined for each experiment included in FDOE dataset 124 as indicated by a value of the group variable g.

Role selection section 402 of input window 400 may further include a frequency selector 416, a validation selector 418, and a filter selector 420. Frequency selector 416 indicates a column name of a column whose numeric values assign a frequency to each row in FDOE dataset 124. Validation selector 418 indicates a column name of a column used to indicate whether each row of FDOE dataset 124 is part of a training dataset used in the model fit, or if it is used for validating the model. Filter selector 420 indicates a column name of a column whose levels define separate analyses.

Selection of cancel selector 406 clears any user selection in role selection window 604 and may close or collapse input window 400. Selection of ok selector 404 saves the current user selections in role selection window 402, collapses, and automatically generates a graph of the results. For illustration, referring to FIG. 5A, a data explorer window 500 is shown in accordance with an illustrative embodiment. FIGS. 5A, 5B, 5C, 6A to 6B, 7, and 8A to 8C show data explorer window 500 and various sub-windows of data explorer window 500 in accordance with an illustrative embodiment.

Data explorer window 500 may include a hierarchy of sub-windows that changes as selections are made from selectors presented in data explorer window 500. For example, referring to FIG. 5A, after selection of ok selector 404, the hierarchy of sub-windows may include a data processing sub-window 502. Data processing sub-window 502 may include a data plot sub-window 504 that is a child window of data processing sub-window 502.

Data explorer window 500 may include a data explorer header bar 506. The hierarchy of sub-windows descend hierarchically from data explorer header bar 506 because they are associated with a functional data exploration of FDOE dataset 124. Data explorer header bar 506 may include a header title 508, an open/close sub-window selector 510, and an open/close menu selector 512. Text to the right of open/close menu selector 512 defines header title 508 that summarizes a content of data explorer window 500. Successive selection of open/close sub-window selector 510 toggles between opening and closing the hierarchy of sub-windows. When toggled closed, open/close sub-window selector 510 may appear as a forward arrow in contrast to the right triangle shown in the illustrative embodiment. Open/close menu selector 512 toggles between showing and not showing a menu of selections associated with data explorer window 500.

Though not labeled for simplicity, each sub-window of data explorer window 500 may include a respective open/close sub-window selector 510, a respective open/close menu selector 512, and a respective header title 508. An indentation level of each sub-window included in the hierarchy of sub-windows may indicate a child and/or sibling relationship between the hierarchy of sub-windows that are all child windows of data explorer window 500. Again, based on selections in open/close menu selector 512 associated with data explorer window 500 and each sub-window of data explorer window 500, the child windows of the hierarchy of sub-windows may change and the hierarchy can be expended or collapsed at the level of different sub-windows. Some sub-windows may not include the respective open/close menu selector 512 when no menu is associated with the respective sub-window. For example, data plot sub-window 504 does not include a respective open/close menu selector 512 because no menu is associated with data plot sub-window 504.

Data processing sub-window 502 also includes header title 508, open/close sub-window selector 510, and open/close menu selector 512, and a data processing header bar 514. Data plot sub-window 504 also includes header title 508, open/close sub-window selector 510, and open/close menu selector 512, and a data plot header bar 516.

Data plot sub-window 504 may include a response graph 518 and a plurality of experiment response graphs 520. The plurality of experiment response graphs 520 includes an experiment response graph for each value of the group variable g in FDOE dataset 124 selected using group variable selector 412. For example, a first experiment response graph 522 shows the response graph that results for a first value of the group variable g in FDOE dataset 124. Response graph 518 includes a graph of response variable y selected using y-variable graph 408 as a function of the explanatory variable x selected using x-variable selector 410. Response graph 518 includes a curve plotted for each value of the group variable g in FDOE dataset 124 selected using group variable selector 412. Each curve may be shown using a different color, symbol, line type, etc. or otherwise labeled to distinguish each value of the group variable g.

Though not shown, a summaries sub-window of data explorer window 500 may include overall summary statistics such as a number of observation vectors in FDOE dataset 124, a number of values of the group variable g in FDOE dataset 124, a mean value, a standard deviation value, a minimum value, a maximum values, etc. The summaries sub-window may further include plots of a functional mean and a functional standard deviation computed for each unique value of group variable g.

Referring again to FIG. 2A, in an operation 208, a sixth indicator may be received that indicates a wavelet type function(s) and one or more values for each associated wavelet hyperparameters to fit response variable y as a function of explanatory variable x for each value of the group variable g. For example, the sixth indicator indicates a name of one or more of wavelet type functions to model a behavior of response variable y given explanatory variable x. A functional model is created by fitting the indicated of wavelet type function(s) to the columns of data identified in FDOE dataset 124 using the second through fourth indicators.

The sixth indicator may be received by model selection application 122 after selection from a user interface window or after entry by a user into a user interface window. A default value for the wavelet type function(s) may further be stored, for example, in computer-readable medium 108. As an example, the one or more wavelet type functions may be selected from "Haar", "Symlet", "Coiflet", "Daubechies", "Shannon", "Meyer", etc. Illustrative wavelet functions are described in Chapter 2 of the book titled Wavelet Methods in Statistics with R by G. P. Nason and published by Springer Science+Business Media, LLC in 2008 (Wavelet Methods). The Symlet wavelet type function is also known as the Daubechies Least-Asymmetric wavelet type function. Of course, the wavelet type function(s) may be labeled or selected in a variety of different manners by the user as understood by a person of skill in the art. In an alternative embodiment, the of wavelet type function(s) may not be selectable, and a single set of wavelet type functions is implemented by model selection application 122. For example, the single set of wavelet type functions may be indicated as "Haar", "Symlet", and "Coiflet", by default or without allowing a selection.

Associated with each wavelet type function are one or more values for zero or more hyperparameters to evaluate based on the respective wavelet type function. For example, the "Haar" wavelet type function does not include any hyperparameters; whereas, "Symlet" includes a single associated hyperparameter that indicates a number of vanishing moments, and "Coiflet" includes two associated hyperparameters, a filter number and a wavelength. The filter number may be used to define a number of vanishing moments as twice the filter number, and a length that is three times the filter number. Using the sixth indicator, the user may select one or more values for each the hyperparameter to evaluate, if any, using a lower bound value, an upper bound value, and an iteration value and/or a specific value instead of a default value. Using the sixth indicator, the user may identify zero or more of the hyperparameters to evaluate using a list of possible values instead of a range of default values. Using the sixth indicator, the user may identify zero or more of the hyperparameters to evaluate using default bounds and initial values. Using the sixth indicator, the user may identify zero or more of the hyperparameters to exclude from the evaluation such that a single value is used for that hyperparameter when selecting values for each hyperparameter configuration.

Figure 5A:
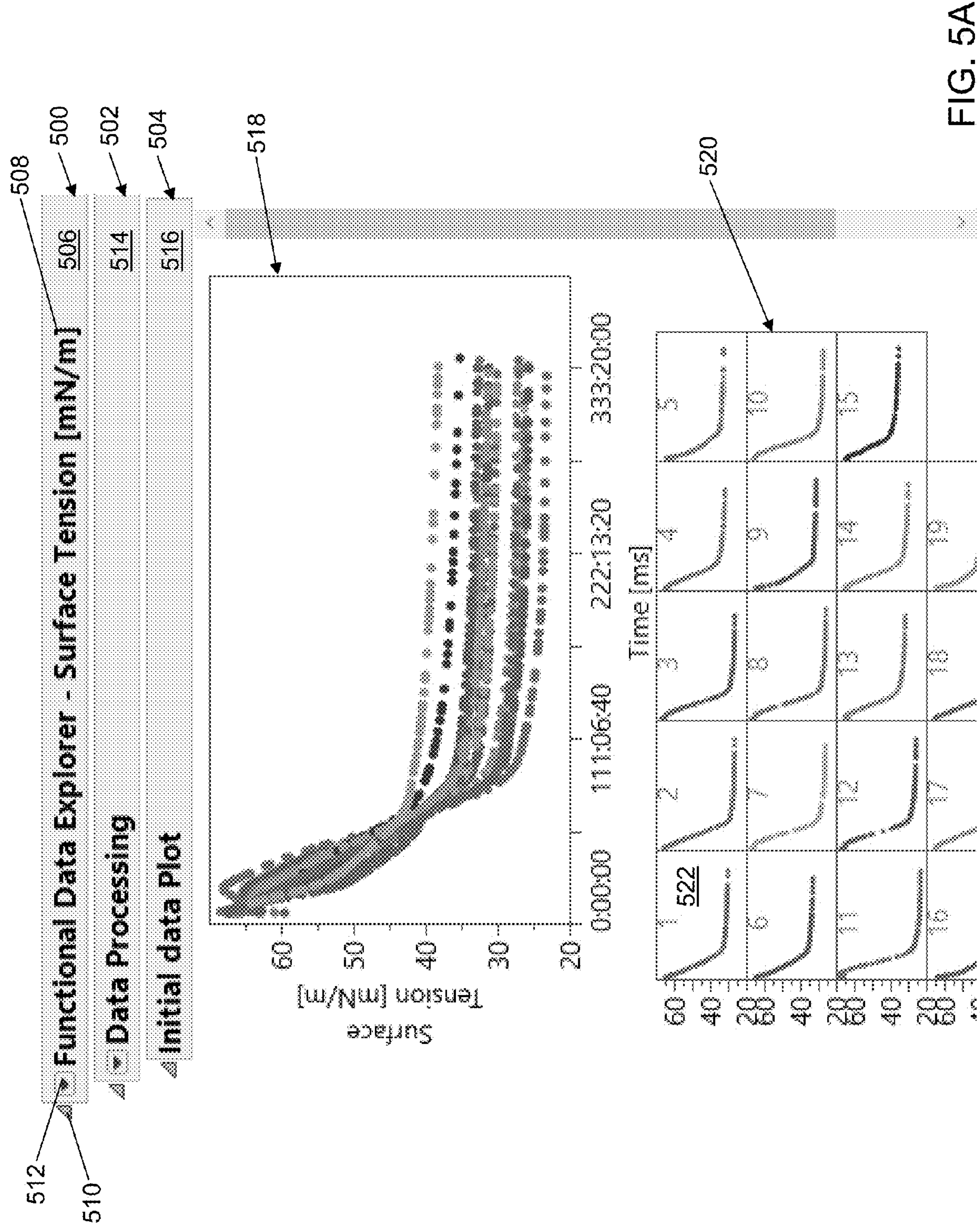
FIGS. 5A through 5C show a user interface supported by the model selection application of FIGS. 2A and 2B and used to present a data explorer window in accordance with an illustrative embodiment.
Figure 5B:
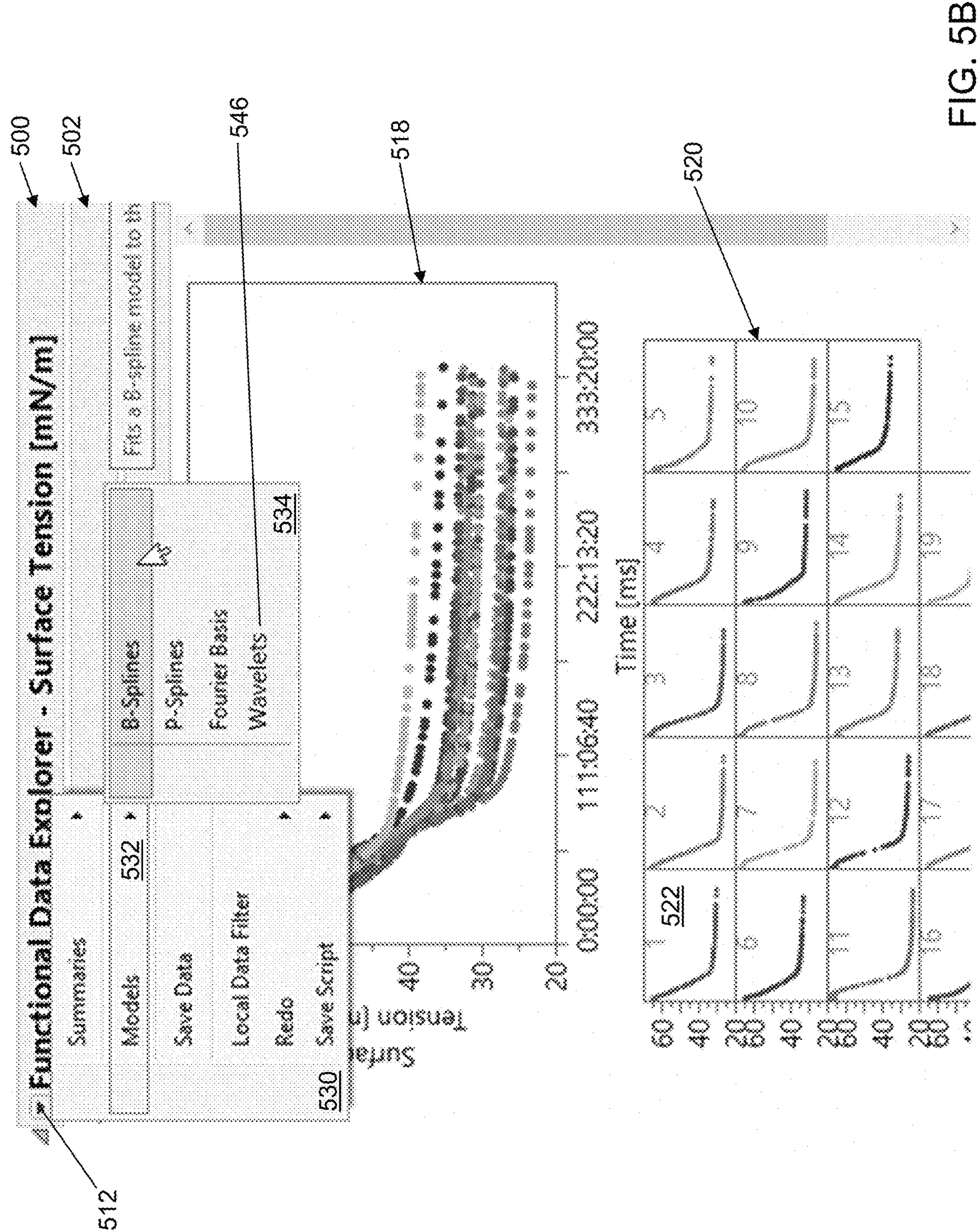
Figure 5C:
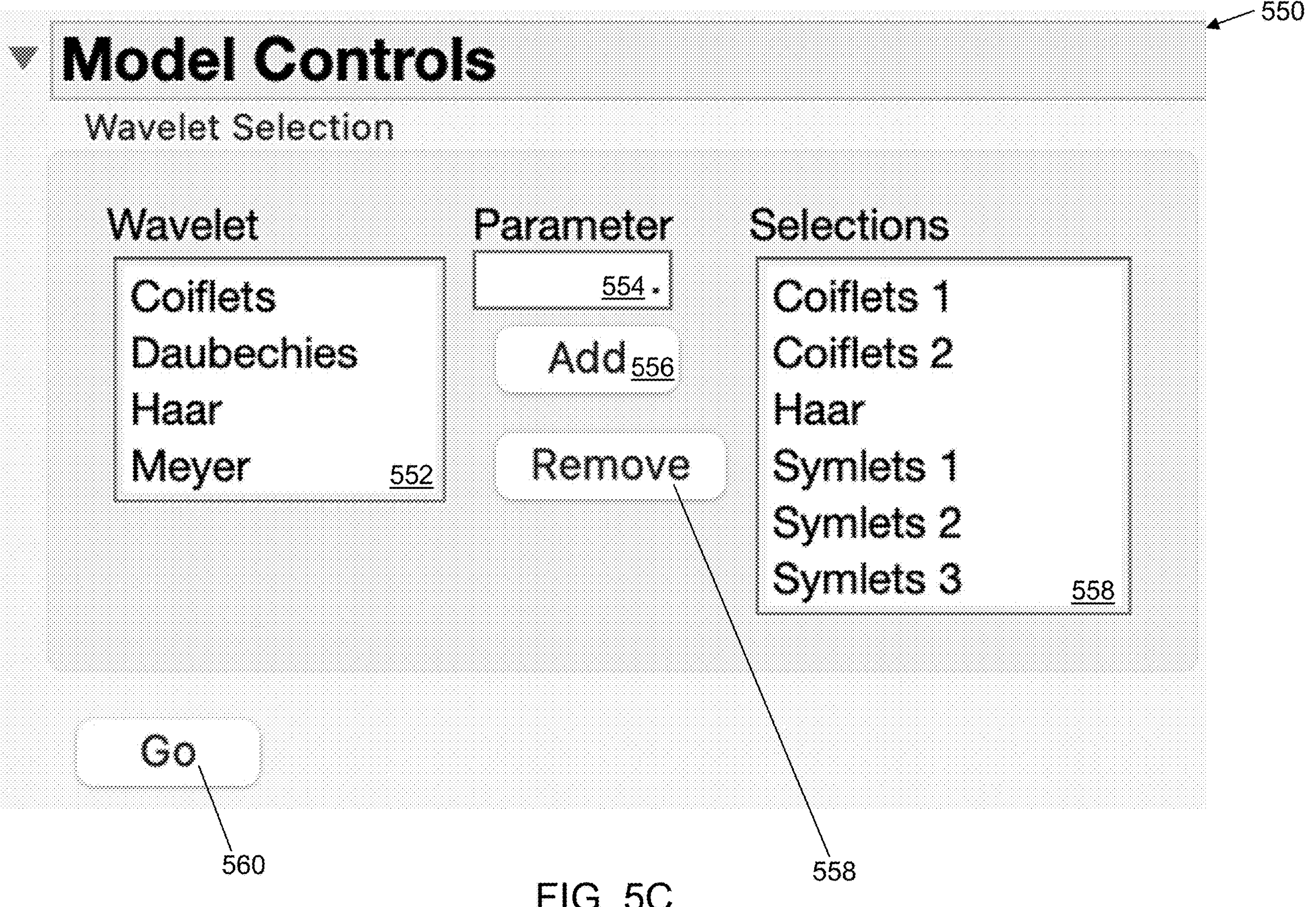

For example, referring to FIG. 5B, after selection of open/close menu selector 512 of data explorer window 500, an options menu 530 may be presented in display 116 in accordance with an illustrative embodiment. Options menu 530 may include a models selector 532. Selection of a forward arrow of models selector 532 presents selectors related to a basis function selection. For example, selection of the forward arrow associated with models selector 532 may result in presentation of a model menu 534 that may include a wavelets selector 546 among other options. A greater or a fewer number of basis models may be included in model menu 534 in alternative embodiments.

Selection of wavelets selector 546 may trigger presentation of a wavelets options window 550 that allows the user to indicate which wavelet type function(s) to use and which hyperparameter values to use for the indicated wavelet type functions. Again, the hyperparameter values to use may be indicated independently for each indicated wavelet type function and may be a list or range of values to use. For example, referring to FIG. 5C, after selection of wavelets selector 546, wavelets options window 550 may be presented in display 116 in accordance with an illustrative embodiment. Wavelets options window 550 may include a wavelet model selector 552, a model parameter text box 554, an add button 556, a wavelet selection list box 558, a remove button 558, and a save button 560. Wavelet model selector 552 includes a list of available wavelet type functions from which the user can select. The user may select one of the listed wavelet type functions which may trigger it to be highlighted. Depending on the wavelet type function selected, zero or more model parameter text boxes 554 may be presented in wavelets options window 550 with an indicator of the type of hyperparameter. The user can enter a single value, a list, or a range of values to use for each hyperparameter using model parameter text box 554. Selection of add button 556 adds the selected wavelet type function with a numerical indicator associated with the wavelet type function to wavelet selection list box 558 to indicate a different value or set of values to evaluate for the selected wavelet type function. For example, the "Coiflets 1" and "Coiflets 2" wavelet functions listed in wavelet selection list box 558 indicate use of the Coiflets wavelet type function with different values for the two hyperparameters. The "Haar" wavelet function listed in wavelet selection list box 558 does not include a numerical indicator because it does not have any hyperparameters to evaluate. The "Symlets 1", "Symlets 2", and "Symlets 3" wavelet functions listed in wavelet selection list box 558 indicate use of the Symlets wavelet type function with three different values for the hyperparameter. Selection of remove button 558 removes a selected wavelet function from wavelet selection list box 558. Selection of save button 560 saves the wavelet functions listed in wavelet selection list box 558 as a list of wavelet functions and may automatically trigger execution of steps 212 through 234.

In an operation 210, a seventh indicator may be received that indicates a fit criterion method to use to estimate a quality of or a goodness of a fit of each wavelet function and hyperparameter value(s) combination to paired values of the explanatory variable x and response variable y read from FDOE dataset 124 for each value of group variable g. For example, the seventh indicator indicates a name of a fit criterion method that may be selected by the user using a model controls sub-window 606 (shown referring to FIG. 6A). The seventh indicator may be received by model selection application 122 after selection from a user interface window or after entry by a user into a user interface window. A default value for the fit criterion method may further be stored, for example, in computer-readable medium 108. As an example, a fit criterion method may be selected from "BIC", "AIC", "GCV", "Robust GCV", "AICc", etc. For example, a default fit criterion method may be indicated by "BIC", which indicates a Bayesian information criterion method, by "AIC", which indicates an Akaike (AIC) information criterion method, by "GCV", which indicates a generalized cross-validation (GCV) information criterion method, by "Robust GCV", which indicates a robust GCV information criterion method, by "AICc", which indicates a corrected AIC information criterion method, etc. Of course, the fit criterion method may be labeled or selected in a variety of different manners by the user as understood by a person of skill in the art. In an alternative embodiment, the fit criterion method may not be selectable, and a single fit criterion method is implemented by model selection application 122. For example, the fit criterion method indicated as "BIC" may be used by default or without allowing a selection.

In an operation 211, an eighth indicator may be received that indicates a grid computation method to use and a power of two option that may be selected by the user using model controls sub-window 606. The eighth indicator may be received by model selection application 122 after selection from a user interface window or after entry by a user into a user interface window. For example, the power of two option may indicate whether the grid to be computed for the data points includes a next highest power of two number of data points (e.g., "Highest"), a next lowest power of two number of data points (e.g., "Lowest"), a maximum number of data points (e.g., "Maximum"), or "None". The data points are defined from values for explanatory variable x and response variable y read from FDOE dataset 124 for each value of group variable g to define an evenly spaced grid of data points for each value of group variable g. In an alternative embodiment, the power of two option may not be received. For example, a default value may be stored, for example, in computer-readable medium 108 and used automatically. In another alternative embodiment, the power of two option may not be selectable. Instead, a fixed, predefined option may be used. For illustration, a default option value for the power of two option may be the next highest power of two number of data points though other option values may be used. There may be other options for defining the number of data points in the grid.

The eighth indicator may further indicate a name of a grid computation method. A default value for the grid computation method may further be stored, for example, in computer-readable medium 108. As an example, a grid computation method may be selected from "Zeroes", "Last Value", "Repeat", "Reflect", etc. For example, a default grid computation method may be indicated by "Zeroes", which indicates that the explanatory variable values are zeroes for additional data points to reach the same size grid indicated by the power of two option. The grid computation method "Last Value" indicates that the explanatory variable values repeat the last value for additional data points to reach the same size grid indicated by the power of two option. The grid computation method "Repeat" indicates that the explanatory variable values repeat the original explanatory variable value sequence for additional data points to reach the same size grid indicated by the power of two option. The grid computation method "Reflect" indicates that the explanatory variable values are reflected for the original explanatory variable value sequence for additional data points to reach the same size grid indicated by the power of two option.

Of course, the grid computation method and the power of two option may be labeled or selected in a variety of different manners by the user as understood by a person of skill in the art. In an alternative embodiment, the grid computation method may not be selectable, and a single grid computation method is implemented by model selection application 122. For example, the grid computation method indicated as "Zeroes" may be used by default or without allowing a selection. In an alternative embodiment, the power of two option method may not be selectable, and a single power of two option is implemented by model selection application 122. For example, the power of two option indicated as "None" may be used by default or without allowing a selection assuming that the data points for each value of group variable g included in FDOE dataset 124 are already on a common grid of explanatory variable values. That is, each function defined by explanatory variable x and response variable y defined for each unique value of group variable g has the same number of observations and the same values for explanatory variable x.

In an operation 212, an evenly spaced grid of data with a number of observations n is defined from values for explanatory variable x and response variable y read from FDOE dataset 124 for each value of group variable g unless the power of two option was indicated as "None" by the eighth indicator. Again, in some cases, explanatory variable x and response variable y read from FDOE dataset 124 for each value of group variable g may already share the same number of observations and the same values for explanatory variable x such that no further processing is required. In this case, the power of two option may indicate "None" to indicate that no grid computation is required. When this is not the case, additional data points may be defined based on the power of two option.

For example, when the power of two option is "Highest", $n=2^k$, where k is an integer value selected to result in a value that is greater than or equal to a number of observations $n_x$ of the function having the largest number of observations. For example, $k=\text{roundup}(\log_2(n_x))$, where roundup determines an integer value rounded up to a next whole integer value, and $n_x$ is the number of observations of the function having the largest number of observations.

For example, when the power of two option is "Lowest", $n=2^k$, where k is an integer value selected to result in a value that is less than or equal to a number of observations $n_x$ of the function having the largest number of observations. For example, $k=\text{rounddown}(\log_2(n_x))$, where rounddown determines an integer value rounded down to a next whole integer value, and $n_x$ is the number of observations of the function having the largest number of observations.

For example, when the power of two option is "Maximum", $n=n_x$, where $n_x$ is the number of observations of the function having the largest number of observations. The wavelet transform is more complicated and slower when the power of two option is "Maximum" or otherwise not a power of two.

Once a value for n is determined based on the power of two option, a grid explanatory variable vector X is defined for each function based on the grid computation method. For example, when the grid computation method is "Zeroes", one or more last values of the explanatory variable x having the largest number of observations may be padded with zeroes for explanatory variable x to result in n observations for each function. For illustration, if n=8 and $n_i=5$ for an $i^{th}$ data series [1, 2, 3, 4, 5] for an $i^{th}$ value of group variable g, grid explanatory variable vector X is computed as [1, 2, 3, 4, 5, 0, 0, 0].

As another example, when the grid computation method is "Last Value", one or more last values of the explanatory variable x having the largest number of observations may be padded with the last value for explanatory variable x to result in n observations for each function. For illustration, if n=8 and $n_i=5$ for an $i^{th}$ data series [1, 2, 3, 4, 5] for an $i^{th}$ value of group variable g, grid explanatory variable vector X is computed as [1, 2, 3, 4, 5, 5, 5, 5].

As yet another example, when the grid computation method is "Repeat", one or more last values of the explanatory variable x having the largest number of observations may be padded by repeating the sequence for explanatory variable x to result in n observations for each function. For illustration, if n=8 and $n_i=5$ for an $i^{th}$ data series [1, 2, 3, 4, 5] for an $i^{th}$ value of group variable g, grid explanatory variable vector X is computed as [1, 2, 3, 4, 5, 1, 2, 3].

As yet another example, when the grid computation method is "Reflect", one or more last values of the explanatory variable x having the largest number of observations may be padded by reflecting the sequence for explanatory variable x to result in n observations for each function. For illustration, if n=8 and $n_i=5$ for an $i^{th}$ data series [1, 2, 3, 4, 5] for an $i^{th}$ value of group variable g, grid explanatory variable vector X is computed as [1, 2, 3, 4, 5, 5, 4, 3]. Reflection extends a behavior at the end of a function.

The explanatory variable x having the largest number of observations may not include a maximum value for the explanatory variable x included all of the functions. In this case, grid explanatory variable vector X may be defined to have a range that covers the full range of values for the explanatory variable x from a minimum value to a maximum value.

Once grid explanatory variable vector X is defined, response variable y values are defined for each value of group variable g using, for example, linear interpolation applied to the values of response variable y read from FDOE dataset 124 for the bounding values of explanatory variable x of grid explanatory variable vector X. Other types of interpolation may be used in alternative embodiments. The evenly spaced grid includes grid explanatory variable vector X and the associated interpolated values of response variable y for each value of group variable g.

In an operation 214, a wavelet function with an associated value for each hyperparameter, if any, is selected. For example, a "Symlet" wavelet function with a number of vanishing moments value w of w=1 may be selected based on the values indicated by the sixth indicator.

In an operation 216, the selected wavelet function is fit to the pairs of the response variable value y and the explanatory variable value x included in the evenly spaced grid defined for each unique value of group variable g. The selected wavelet function is separately fit for each value of the group variable g. For illustration, a discrete wavelet transformation as described in a paper titled *Adapting to Unknown Smoothness via Wavelet Shrinkage* by David L. Donoho and lain M. Johnstone and published in the Journal of the American Statistical Association volume 90 number 432 pages 1200-1224 in December 1995 (Smoothness) may be used to fit the selected wavelet function to each set of evenly spaced data associated with a unique value of the group variable g. A shrinkage procedure as described in the Smoothness paper further may be applied to smooth the fit and introduce sparsity in the coefficients. The result is n coefficients defined for each value of the group variable g.

In an operation 218, a criterion fit value is computed for the fit wavelet function for each value of the group variable g based on the fit criterion method selected in operation 210. An average criterion fit value may be computed as an average of the criterion fit value computed for each unique value of the group variable g.

In an operation 220, coefficients that describe the wavelet function fit for each value of the group variable g, the associated criterion fit value, the average criterion fit value, and the respective value of the group variable g may be stored in computer-readable medium 108 in association with an indication of the selected wavelet function and the associated value for each hyperparameter, if any. The coefficients in combination with the wavelet type function and the associated zero or more hyperparameters define a variation between the response variable y based on the explanatory variable x for each value of the group variable g.

In an operation 222, a determination is made concerning whether there is another wavelet type function and associated value(s) of the zero or more hyperparameters for the wavelet type function to evaluate. When there is another wavelet type function to evaluate, processing continues in an operation 224. When there is not another wavelet type function to evaluate, processing continues in an operation 230 shown referring to FIG. 2B. For example, based on the sixth indicator, a list of wavelet type functions with values for each of the zero or more hyperparameters of the wavelet type function may be created. A different wavelet function is added to the list for each unique combination of wavelet type function and/or hyperparameter value(s). If the complete list has been processed, processing continues in operation 230. Otherwise, processing continues in operation 224.

In operation 224, a next wavelet type function with its associated wavelet type function and its associated values for each of the zero or more hyperparameters is selected from the list, and processing continues in operation 216 to fit the wavelet function using the next wavelet type function.

Referring to FIG. 2B, in an operation 230, the wavelet functions are ordered from a best fit to a worst fit based on the average criterion fit value computed for each wavelet function selected in operations 214 and 224. For example, a best to worst fit may be identified from the stored average criterion fit values based on increasing values when the criterion is a measure of error. In alternative embodiments, a best to worst fit may be identified from the stored average criterion fit values based on decreasing values when the criterion is a measure of accuracy. The best fit wavelet function is further identified. A model number further may be associated with each wavelet function in numerical order based on the best fit to the worst fit. For example, a model number of one may be associated with the wavelet function resulting in the best fit, a model number of two may be associated with the wavelet function resulting in a second best fit, and so on. A model number equal to a number of the wavelet functions in the list of wavelet type functions may be associated with the wavelet function resulting in the worst fit.

In an operation 232, best fit wavelet functions are presented in display 116 using the coefficients computed using the wavelet function providing the best fit.

In an operation 233, a criterion fit graph is presented in display 116.

In an operation 234, a model details table is presented in display 116.

Figure 6A:
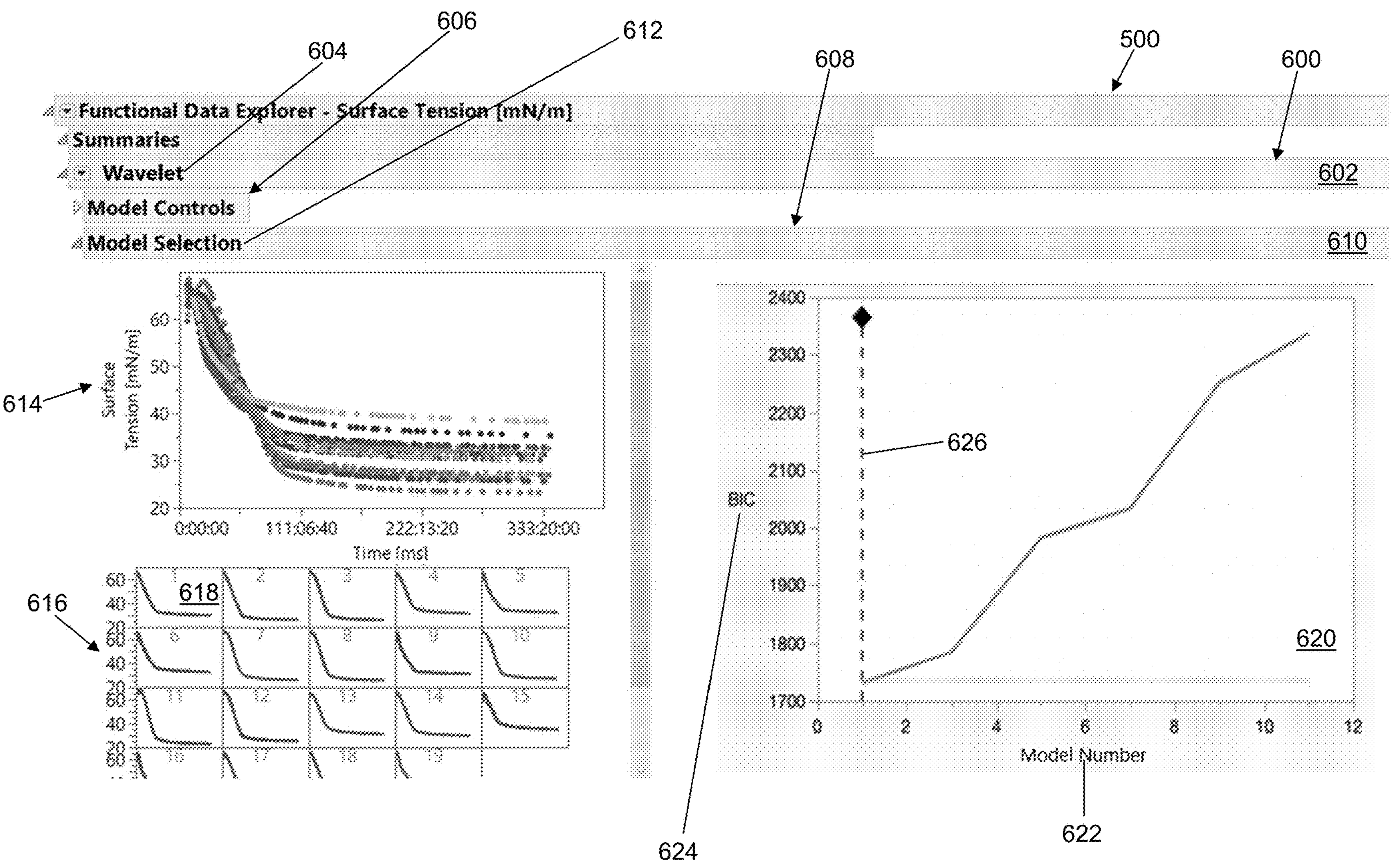
Figure 7:
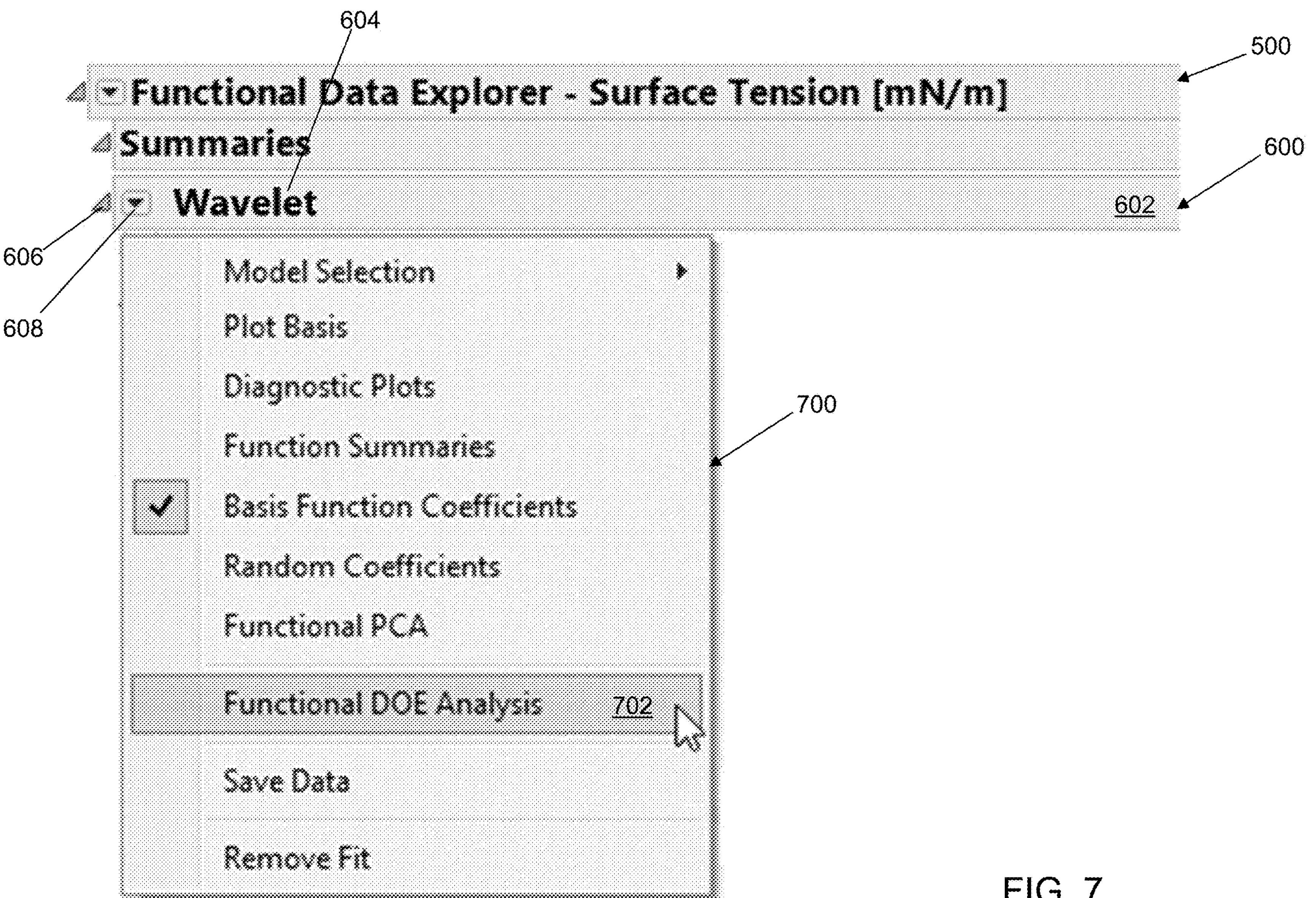
FIG. 7 show a user interface supported by the model selection application of FIGS. 2A and 2B and used to provide a functional design of experiments (FDOE) selection option in accordance with an illustrative embodiment.

For example, referring to FIG. 6A, a wavelet sub-window 600 is presented as a child window of data explorer window 500. Wavelet sub-window 600 may include a wavelet header bar 602 that includes a title 604 that indicates “Wavelet” in the illustrative embodiment. Wavelet sub-window 600 may include model controls sub-window 606 and a model selection sub-window 608 that are child windows of wavelet sub-window 600. Model selection sub-window 608 may include a model selection header bar 610 that includes a title 612 that indicates “Model Selection” in the illustrative embodiment.

Model selection sub-window 608 may include a fit response graph 614 and a plurality of fit response graphs 616 similar to response graph 518 and the plurality of experiment response graphs 520 though showing FDOE dataset 124 fit using the best wavelet function identified in operation 230. The plurality of fit response graphs 616 includes a fit response graph for each value of the group variable g selected using group variable selector 412. For example, a first fit response graph 618 shows the fit response graph that results for a first value of the group variable g. Fit response graph 614 includes a graph of response variable y fit using the best wavelet function identified in operation 230 as a function of the explanatory variable x. Fit response graph 614 includes a curve plotted for each value of the group variable g. Each curve may be shown using a different color, symbol, line type, etc. or otherwise labeled to distinguish each value of the group variable g.

Model selection sub-window 608 further may include a fit criterion graph 620 with an x-value 622 defined by the model number and a y-value defined by the fit criterion method selected in operation 210. The fit criterion value is plotted as a function of the model number. In the illustrative embodiment, the fit criterion method is “BIC”, which is a measure of error. As a result, the criterion fit values are ordered in increasing value in fit criterion graph 620. The criterion fit values are computed as an average of the criterion fit values computed for the curve fit for each value of the group variable g.

Fit criterion graph 620 further includes a model slider 626 that allows a user to select a different model number. As understood by a person of skill in the art, model selection application 122 receives indicators of the user’s interactions with the user interface window and responds based on the received indicator to update fit response graph 614 and the plurality of fit response graphs 616 based on the wavelet function associated with the selected model number. By default, a model number 1 having the best fit is selected and defines a location of model slider 626.

Referring to FIG. 6B, wavelet sub-window 600 further may include a model details sub-window 630 that is another child window of wavelet sub-window 600. Model details sub-window 630 may include a details table 632 that includes a model number column 634, a wavelet type function column 636, a hyperparameter values column 638, a fit criterion value column 640, and a fit criterion histogram bar column 642. By default, a first row associated with model number 1 having the best fit is selected.

Model number column 634 includes the model number associated with each wavelet function as determined in operation 230. Wavelet type function column 636 includes an indicator of the wavelet type function associated with the model number. Hyperparameter values column 638 includes the zero or more hyperparameter values associated with the wavelet type function and the model number. For example, when the wavelet type function does not have a hyperparameter, an associated entry in hyperparameter values column 638 may be blank or indicate “.” as shown in the illustrative embodiment. Fit criterion value column 640 shows the criterion fit value associated with the model number. Fit criterion histogram bar column 642 shows the criterion fit value associated with the model number. Represented by a histogram bar that is plotted relative to other histogram bars in the fit criterion histogram bar column 642.

In an illustrative embodiment, the user may select a row from details table 632 to select a different model number. As understood by a person of skill in the art, model selection application 122 receives indicators of the user’s interactions with the user interface window and responds based on the received indicator to update fit response graph 614 and the plurality of fit response graphs 616 based on the wavelet function associated with the selected row. A location of model slider 626 is further updated based on the model number associated with the selected row.

Referring again to FIG. 2B, in an operation 236, a determination is made concerning whether the user adjusted the model number by selecting a different in details table 632 or by sliding model slider 626 to a different model number. When the user adjusted the model number, processing continues in an operation 238. When the user did not adjust the model number, processing continues in an operation 242.

In operation 238, a wavelet function selected is determined. For example, model selection application 122 receives an indicator of where the model slider 626 is slid or which row is selected from details table 632 to determine a selected wavelet function.

In operation 240, fit response graph 614 and the plurality of fit response graphs 616 are updated to show the fit results using the determined wavelet function, and processing continues in operation 236.

In operation 242, a determination is made concerning whether the user has indicated to store the selected fit wavelet function to FDOE analysis description 126. When the user has indicated to selected fit wavelet function, processing continues in an operation 244. When the user has not indicated to selected fit wavelet function, processing may continue in operation 208 to allow the user to adjust the wavelet type function(s) to fit or in one of operations 204, 206, 210, or 236 to receive new values to evaluate based on user interaction with model selection application 122.

In operation 244, an indicator of a user request to perform FDOE may be received. For illustration, referring to FIG. 7, a fit options menu 700 is presented. Fit options menu 700 may include an FDOE analysis selector 702. Selection of FDOE analysis selector 702 triggers an indicator of a user request to perform FDOE.

Referring again to FIG. 2B, in an operation 246, a prediction model is trained using the n coefficients computed for each value of group variable g as a function of the one or more factor variables f selected in operation 206. For example, a generalized regression model is fit to each set of n coefficients using the one or more factor variables f as model effects. By default, a two-degree factorial model may be fit using an estimation method of best subset. Alternatively, a model script can be specified, for example, in a data table that defines a desired model fit. Other models may be used such as a neural network model, a decision tree model, a gradient boosting tree model, etc.

In an operation 248, a prediction model execution result computed using the trained prediction model is presented for each value of group variable g. For example, selection of FDOE analysis selector 702 triggers creation of a model analysis within data explorer window 500. For illustration, referring to FIG. 8A to 8C, the hierarchy of sub-windows is updated based on user selection of FDOE analysis selector 702.

Figure 8A:
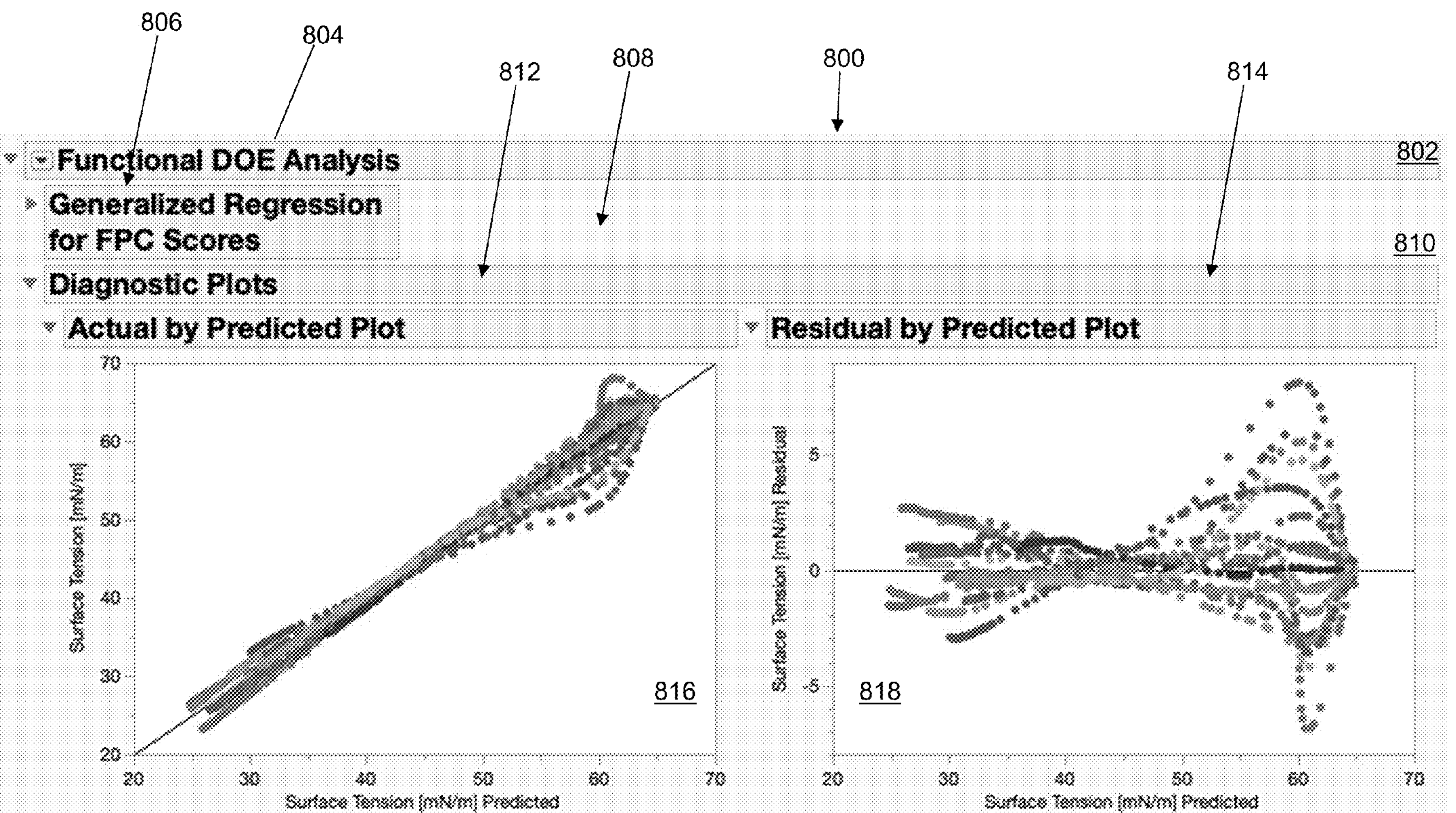
FIGS. 8A through 8C show a user interface supported by the model selection application of FIGS. 2A and 2B and used to present FDOE results in accordance with an illustrative embodiment.

Referring to FIG. 8A, the updated hierarchy of sub-windows may include an FDOE analysis sub-window 800 as a child window of wavelet sub-window 600. FDOE analysis sub-window 800 may include an analysis header bar 802 that includes a title 804 that indicates "Functional DOE Analysis" in the illustrative embodiment. FDOE analysis sub-window 800 may include a model fit sub-window 806, a diagnostic plot sub-window 808, and a profiler sub-window 820 (shown referring to FIG. 8B) that are child windows of FDOE analysis sub-window 800.

Diagnostic plot sub-window 808 may include an actual prediction comparison sub-window 812 and a prediction residual comparison sub-window 814. Actual prediction comparison sub-window 812 includes an actual graph 816 that shows response variable y read from FDOE dataset 124 for each value of the group variable g on a vertical axis and a predicted response variable value y for each value of the group variable g on a horizontal axis. In the illustrative embodiment, the predicted response variable value is predicted using a generalized regression model with the observation vectors read from FDOE dataset 124 for each value of the group variable g. Actual graph 816 includes a separate curve for each value of the group variable g in FDOE dataset 124. Each curve may be shown using a different color, symbol, line type, etc. or otherwise labeled to distinguish each value of the group variable g.

Prediction residual comparison sub-window 814 includes a residual graph 818 that shows a difference between response variable y and the predicted response variable value y for each value of the group variable g on the vertical axis and the predicted response variable value y for each value of the group variable g on the horizontal axis. Residual graph 818 includes a separate curve for each value of the group variable g in FDOE dataset 124. Each curve may be shown using a different color, symbol, line type, etc. or otherwise labeled to distinguish each value of the group variable g. Actual graph 816 and residual graph 818 provide a visual evaluation of how well the selected model models the observation vectors read from FDOE dataset 124 for each value of the group variable g.

Figure 8B:
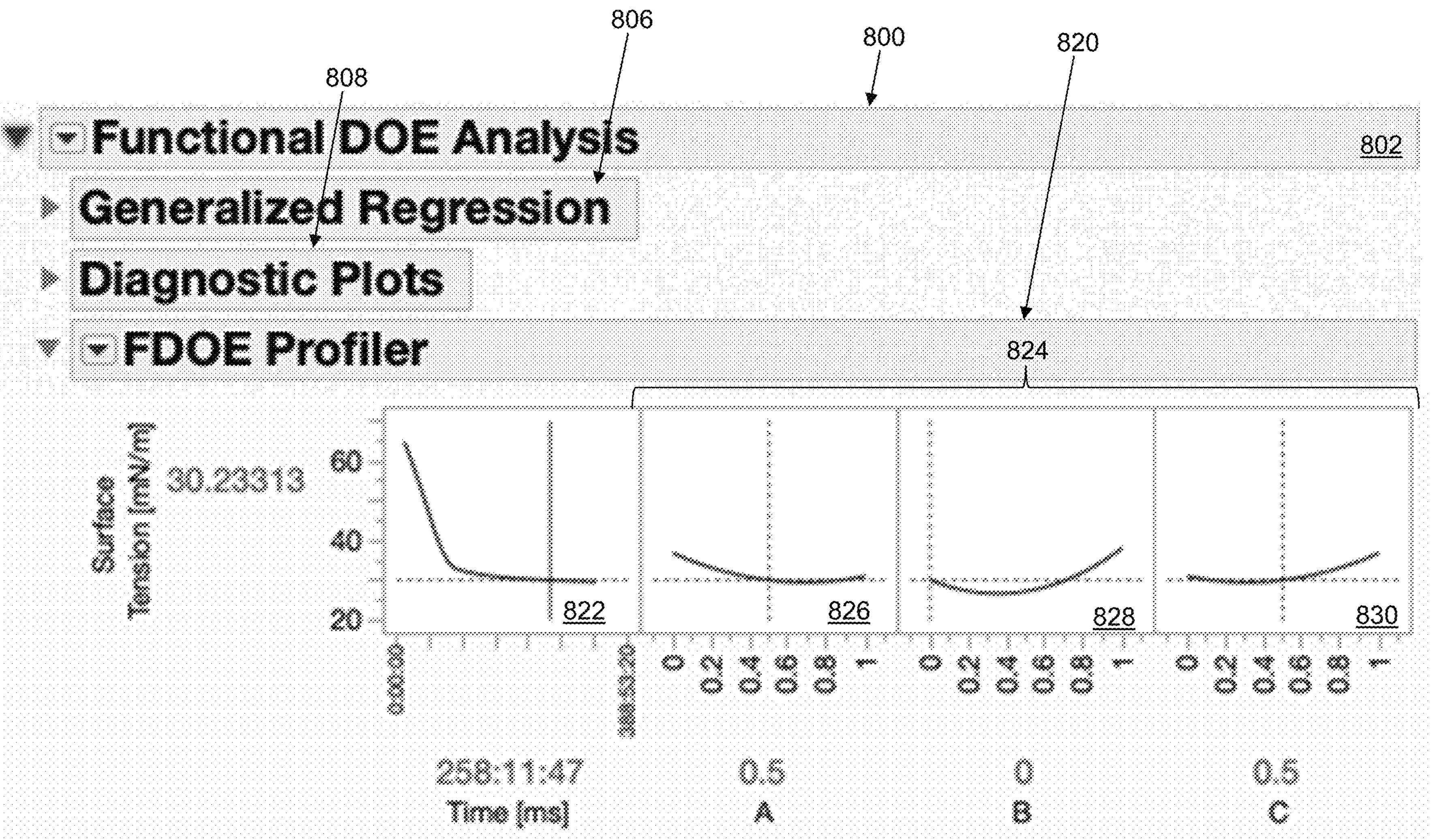

Referring to FIG. 8B, profiler sub-window 820 may include a prediction graph 822 and one or more factor profile graphs 824. The one or more factor profile graphs 824 include a profile trace for each factor variable of the one or more factor variables f to show how response variable y varies as a function of each respective factor variable. For example, in the illustrative embodiment, the three factor variables "A", "B", and "C" were selected using f-variable selector 414. A first factor profile graph 826 shows response variable y as a function of factor variable "A". A second factor profile graph 828 shows response variable y as a function of factor variable "B". A third factor profile graph 830 shows response variable y as a function of factor variable "C". Profiler sub-window 820 can be used to show how changing one factor at a time effects the predicted values of response variable y shown in a response curve of prediction graph 822.

Each of prediction graph 822 and the one or more factor profile graphs 824 present a profile based on the trained prediction model, which in the illustrative embodiment is a two-degree factorial model using an estimation method of best subset and a validation method of AICc. The curve within each of first factor profile graph 826, second factor profile graph 828, and third factor profile graph 830 show a profile trace for each the three factor variables "A", "B", and "C", respectively. A profile trace is a predicted response as one factor variable is changed while the other factor variables are held constant at their current values.

The trained prediction model can be modified by the user. For example, model sub-windows (not shown) such as a response distribution sub-window, an estimation method sub-window, a validation method sub-window allow the user to change the type of model and the model hyperparameters as well as how the "best" model is selected. The validation method sub-window may provide options for selecting methods available for validation of the model fit such as BIC, AICc, k-fold, etc.

The trained prediction model can further be modified using selectors in profiler sub-window 820 adjustment of which results in recomputing the profile traces and predicted responses and an automatic update of the information shown, for example, in prediction graph 822 and in the one or more of the factor profile graphs 824. For example, dotted vertical lines are included in each of the one or more of the factor profile graphs 824. Each dotted vertical line is initially presented in association with a best fit model based on model parameters selected for the trained prediction model that are also displayed below the x-axis of each graph of the one or more of the factor profile graphs 824. The user can drag and drop any of the dotted vertical lines to explore how the prediction model results change as the value of individual factors changes. Movement of any of the dotted vertical lines changes the value of the respective factor and shows a vertical slice across each factor while holding the other factors at their current values. The prediction trace for the factor associated with the moved dotted vertical line may not be affected, but the prediction trace of the other factors may change. A location of a solid vertical line in prediction graph 822 also changes as a result of the adjusted value for one of the one or more factor variables f.

As another example, dotted horizontal lines are included in prediction graph 822 and in each of the one or more of the factor profile graphs 824. The dotted horizontal lines are vertically aligned with each other and indicate a current predicted value of the response variable y that crosses an intersection point of the profile traces to define their current value lines. If there are interaction effects or cross-product effects in the trained prediction model, the profile trace can shift their slope and curvature as any factor value is changed. If there are no interaction effects, the traces change only in height, not slope or shape. The user may also drag and drop any of the dotted horizontal lines to explore how the factor values change as the current value of the response variable y changes.

The current value of the response variable y is shown to the left of the y-axis of prediction graph 822. The current value of the explanatory variable x is shown below the x-axis of prediction graph 822. The current value for each factor variable of the one or more factor variables f is displayed below the x-axis of each graph of the one or more of the factor profile graphs 824. The current values, are updated as the user interacts with the dotted horizontal or vertical lines.

Figure 8C:
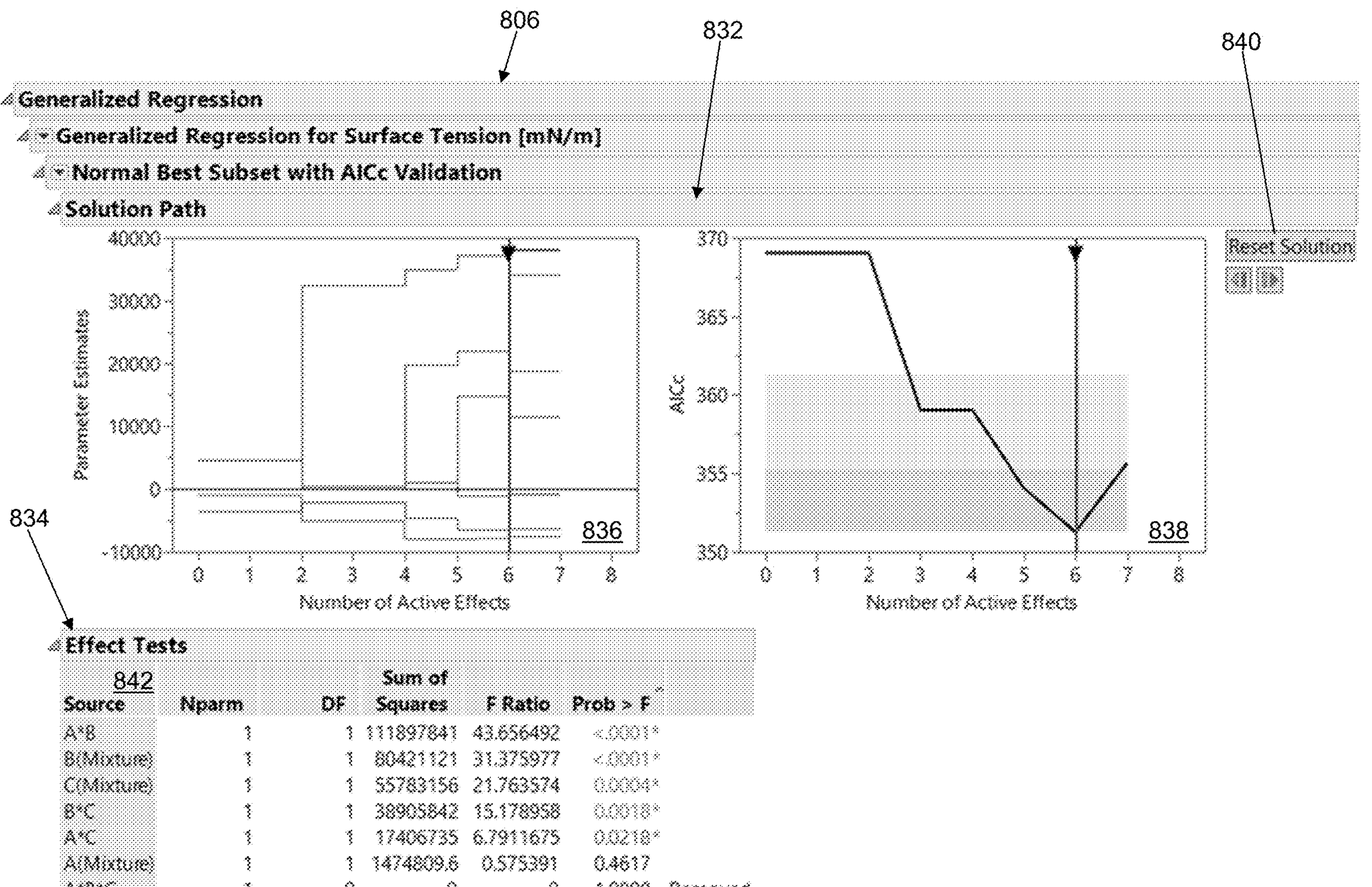

Referring to FIG. 8C, model fit sub-window 806 may include a solution path sub-window 832 and an effect tests sub-window 834 as child windows. Solution path sub-window 832 may include a parameter estimate graph 836 and a validation graph 838. Parameter estimate graph 836 displays values of the estimated parameters. Validation graph 838 displays values of the validation statistic corresponding to the selected validation method. In the illustrative embodiment, AICc is the selected validation method. The horizontal scaling for both graphs is a number of active effects based on selection of the best subset estimation method. The best subset estimation method computes parameter estimates by increasing a number of active effects in the model at each step. In each step, the model is chosen among all possible models with a number of effects given by the step number. Step 0 corresponds to an intercept-only model. Step 1 corresponds to a best model of those that contain a single active effect. The steps continue up to a value of a maximum number of effects that may be defined by the user.

Validation graph 838 presents statistics that describe how well models fit across values of a tuning parameter, or equivalently, across values of a magnitude of scaled parameter estimates. The statistics plotted depend on the selected validation method though smaller values are better. For the k-fold and leave-one-out validation methods, and for a validation column with more than three values, the statistic may be a mean of a scaled negative log-likelihood values across the folds.

Vertical lines with an arrow are included on both graphs at a value of the number of active effects for the solution presented in actual graph 822. Initially, the vertical lines are shown at a location of the best model. The arrow at a top of the vertical lines can be dragged and dropped to a new number of active effects to explore solutions which in turn changes the prediction model and the information presented in the related sub-windows.

A user may further click anywhere in validation graph 838 to change the prediction model. As the vertical line is moved to indicate a new model, a dashed vertical line remains at the best fit model. Selection of s reset solution button 840 returns the vertical lines to the initial best fit solution and, again, the information presented in the related sub-windows is updated accordingly.

Effect tests sub-window 834 is a sibling window relative to solution path sub-window 832. Effect tests sub-window 834 may include an effect test table 842. Effect test table 842 may include a source column, a number of parameters column, a degrees of freedom column, a sum of squares column, an f-ratio column, and a p-value column. The source column may include a list of effects that can be included in the prediction model. The number of parameters column may include a number of parameters associated with each effect included in the list of effects. The degrees of freedom column may include a degrees of freedom for a Wald chi-square test associated with each effect included in the list of effects, which is a number of nonzero parameter estimates associated with the effect in the model. The sum of squares column may include a sum of squares for a hypothesis that the effect included in the list of effects is zero. The f-ratio column may include an f-statistic for testing that the effect included in the list of effects is zero. The f-statistic is a ratio of a mean square for the effect divided by a mean square for the error. The mean square for the effect is the sum of squares for the effect divided by its degrees of freedom. The p-value column may include a p-value for the effect test associated with each effect included in the list of effects.

Selection of an effects line shown in parameter estimate graph 836 triggers a highlight of corresponding terms in effect test table 842. Selecting a row in effect test table 842 highlights a corresponding effects line in parameter estimate graph 836. Multiple paths or rows may be selected.

Referring again to FIG. 2B, in an operation 250, a determination is made concerning whether the user has adjusted the model. When the user has adjusted the model, processing continues in operation 246 to train a new prediction model with the new parameters and automatically update the information presented in one or more of the sub-windows. When the user has not adjusted the model, processing continues in an operation 252.

In operation 252, a determination is made concerning whether the user has indicated that the analysis is done. When the user has indicated that the analysis is done, processing continues in an operation 254. When the user has indicated that the analysis is not done, processing continues, for example, in operation 208 to allow the user to adjust the wavelet type function(s) to fit or in one of operations 204, 206, 210, or 236 to receive new values to evaluate based on user interaction with model selection application 122.

In operation 254, analysis information is written to and stored in FDOE analysis description 126, and processing may be stopped. For example, the coefficients for the selected wavelet function and its associated zero or more hyperparameters may be written to and stored in FDOE analysis description 126. An error value and/or a residual value may be computed between results generated using the selected wavelet function and the values read from FDOE dataset 124. The computed error value and/or a residual value also may be written to and stored in FDOE analysis description 126. Information that describes the model trained in operation 246 may further be written to and stored in FDOE analysis description 126. The one or more factor variables f may further be written to and stored in FDOE analysis description 126 as variables used to train a prediction model. For example, any of the one or more factor variables determined to have a sufficient effect on response variable y may be variables selected to further train a predictive model. As a result, model selection application 122 identifies relevant features to be used to model response variable y possibly reducing a dimension of the model that may be written to and stored in FDOE analysis description 126.

Model selection application 122 allows the user to interactively adjust the wavelet function used to fit data. As stated previously, model selection application 122 is easy to use and provides approximately instantaneous feedback so that the user can quickly and efficiently change wavelet function used to fit data and gain insight more quickly and with less effort and wasted time. Model selection application 122 further allows the user to interactively adjust a model of each group variable function as a function of each of the one or more factor variables to better understand an effect of each of the one or more factor variables on response variable y.

Wavelet function models are ideal for working with functional data that have sharp peaks. Examples include spectroscopy data to find the chemical composition of a material, or chromatography data to analyze the quality of stain-free technology. These types of data can be used to understand how factors in a manufacturing process impact an outcome of interest, such as a composition of a material or a quality of a stain-free technology. Because the coefficients in wavelet function models provide direct insight into a structure of the data, they are an ideal way to link the factors to the outcome.

A primary advantage of wavelet FDOE is that it fits a model that matches the underlying structure of chemical spectra well. Chemical spectra are often mixture distributions of peaks that correspond to distinct chemical features. These peaks could correspond to chemical constituents in a mixture, as in chromatography data, or individual functional groups, as in NMR spectroscopy. The chemical changes for which modeling is desired often occur on the level of peaks independently. Thus, a wavelet FDOE model fits a model that deconvolutes these spectra into their individual peaks, and fits a model to the peaks directly.

Wavelet FDOE also accounts for the correlation that occurs along the spectra due to that fact that several wavelengths in a localized region measure the same peak. However, by first separating spectra into its component peaks, wavelet FDOE is able to avoid overfitting chance correlations that often occur between disjoint regions that do not correspond to the same peak. This is an advantage over a current functional principal component (FPC) analysis (FPCA) approach to FDOE. FPCA identifies a small set of FPC scores that summarize a majority of a variation in a set of spectra, but is likely to link multiple peaks or even noise regions into the same FPC. Linking signal and noise regions clearly worsens a quality of the model, and linking multiple important peaks can also be problematic because a user often prefers to fit a separate regression model to each peak.

Figure 9:
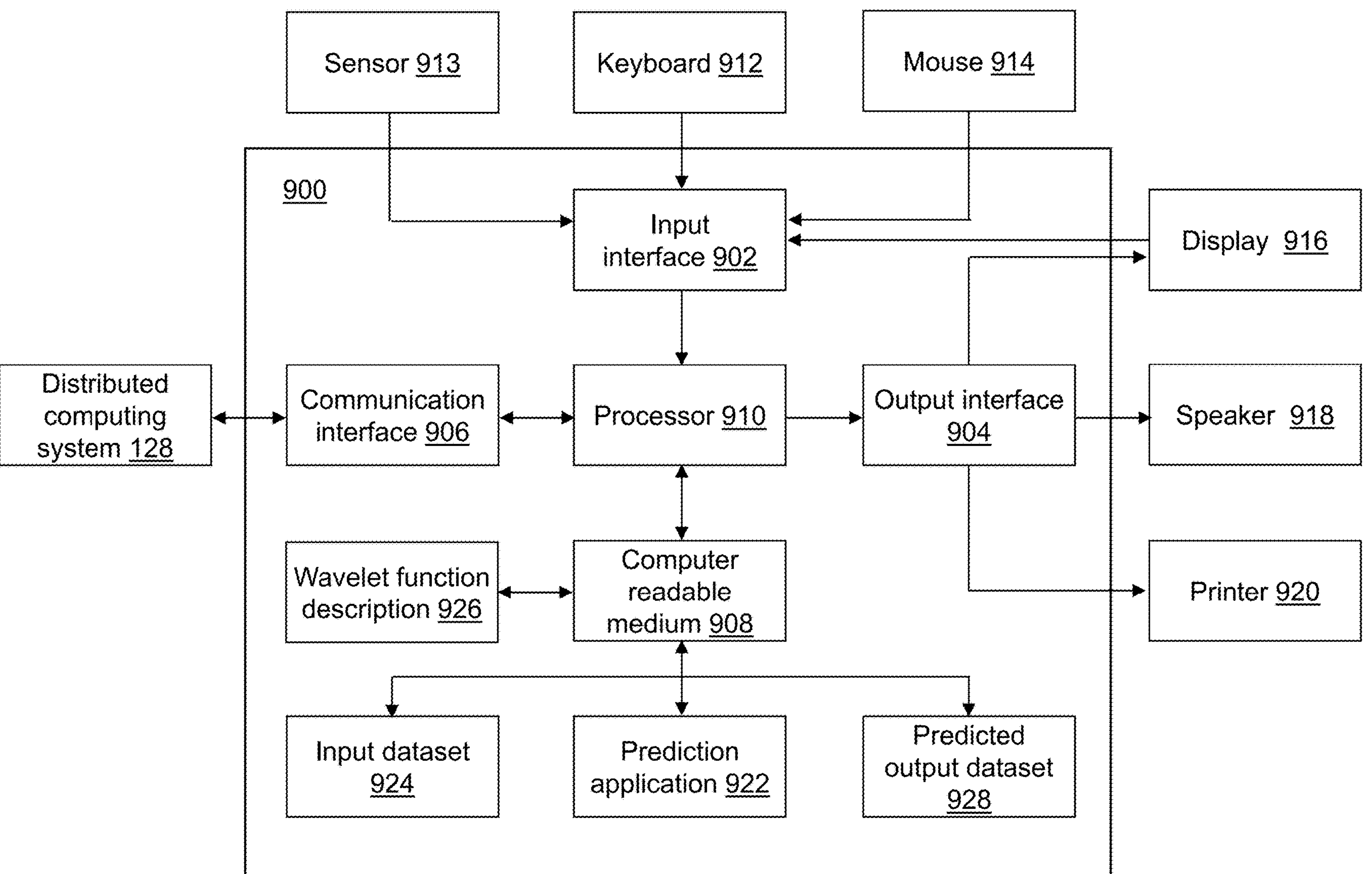
FIG. 9 depicts a block diagram of a prediction device that uses the selected model to predict a result in accordance with an illustrative embodiment.

Referring to FIG. 9, a block diagram of a prediction device 900 is shown in accordance with an illustrative embodiment. Prediction device 900 may include a second input interface 902, a second output interface 904, a second communication interface 906, a second non-transitory computer-readable medium 908, a second processor 910, a prediction application 922, a wavelet function description 926, input dataset 924, and predicted output dataset 928. Wavelet function description 926 may be read or extracted from FDOE analysis description 126. Fewer, different, and/or additional components may be incorporated into prediction device 900. Prediction device 900 and model selection device 100 may be the same or different devices.

Second input interface 902 provides the same or similar functionality as that described with reference to input interface 102 of model selection device 100 though referring to prediction device 900. Second output interface 904 provides the same or similar functionality as that described with reference to output interface 104 of model selection device 100 though referring to prediction device 900. Second communication interface 906 provides the same or similar functionality as that described with reference to communication interface 106 of model selection device 100 though referring to prediction device 900. Data and messages may be transferred between prediction device 900 and distributed computing system 128 using second communication interface 906. Second computer-readable medium 908 provides the same or similar functionality as that described with reference to computer-readable medium 108 of model selection device 100 though referring to prediction device 900. Second processor 910 provides the same or similar functionality as that described with reference to processor 110 of model selection device 100 though referring to prediction device 900.

Prediction application 922 performs operations associated with predicting values for response variable y using a wavelet function description 926 based on values for the explanatory variable x stored in input dataset 924. Dependent on the type of data stored in FDOE dataset 124 and input dataset 924, prediction application 922 may identify anomalies as part of process control, for example, of a manufacturing process, for machine condition monitoring, for example, an electro-cardiogram device, etc. Some or all of the operations described herein may be embodied in prediction application 922. The operations may be implemented using hardware, firmware, software, or any combination of these methods.

Referring to the example embodiment of FIG. 9, prediction application 922 is implemented in software (comprised of computer-readable and/or computer-executable instructions) stored in second computer-readable medium 908 and accessible by second processor 910 for execution of the instructions that embody the operations of prediction application 922. Prediction application 922 may be written using one or more programming languages, assembly languages, scripting languages, etc. Prediction application 922 may be integrated with other analytic tools. For example, prediction application 922 may be implemented using or integrated with one or more SAS software tools such as JMP®, Base SAS, SAS/STAT®, of SAS® Enterprise Miner™ SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Analytics, SAS® Viya™, SAS In-Memory Statistics for Hadoop®, and SAS® Forecast Server, all of which are developed and provided by SAS Institute Inc. of Cary, N.C., USA. One or more operations of prediction application 922 further may be performed by an ESPE. Prediction application 922 and model selection application 122 further may be integrated applications.

Prediction application 922 may be implemented as a Web application. Prediction application 922 may be integrated with other system processing tools to automatically process data generated as part of operation of an enterprise using second input interface 902, second output interface 904, and/or second communication interface 906 so that appropriate action can be initiated in response. For example, a warning or an alert may be presented using a second display 916, a second speaker 918, a second printer 920, etc. or sent to one or more computer-readable media, display, speaker, printer, etc. of distributed computing system 128 based on predicted values for response variable Y.

FDOE dataset 124 and input dataset 924 may be generated, stored, and accessed using the same or different mechanisms. Similar to FDOE dataset 124, input dataset 924 may include a plurality of rows and a plurality of columns with the plurality of rows referred to as observation vectors or records, and the columns referred to as variables that are associated with an observation. Input dataset 924 may be transposed.

Similar to FDOE dataset 124, input dataset 924 may be stored on second computer-readable medium 908 or on one or more computer-readable media of distributed computing system 128 and accessed by prediction device 900 using second communication interface 906. Data stored in input dataset 924 may be a sensor measurement or a data communication value, for example, from a sensor 913, may be generated or captured in response to occurrence of an event or a transaction, generated by a device such as in response to an interaction by a user with the device, for example, from a second keyboard 912 or a second mouse 914, etc. The data stored in input dataset 924 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in input dataset 924 may be captured at different time points periodically, intermittently, when an event occurs, etc. One or more columns may include a time value. Similar to FDOE dataset 124, data stored in input dataset 924 may be generated as part of the IoT, and some or all data may be pre- or post-processed by an ESPE.

Similar to FDOE dataset 124, input dataset 924 may be stored in various compressed formats such as a coordinate format, a compressed sparse column format, a compressed sparse row format, etc. Input dataset 924 further may be stored using various structures as known to those skilled in the art including a file system, a relational database, a system of tables, a structured query language database, etc. on model selection device 100, on prediction device 900, and/or on distributed computing system 128. Prediction device 900 and/or distributed computing system 128 may coordinate access to input dataset 924 that is distributed across a plurality of computing devices. For example, input dataset 924 may be stored in a cube distributed across a grid of computers as understood by a person of skill in the art. As another example, input dataset 924 may be stored in a multi-node Hadoop® cluster. As another example, input dataset 924 may be stored in a cloud of computers and accessed using cloud computing technologies, as understood by a person of skill in the art. The SAS® LASR™ Analytic Server and/or SAS® Viya™ may be used as an analytic platform to enable multiple users to concurrently access data stored in input dataset 924.

Figure 10:
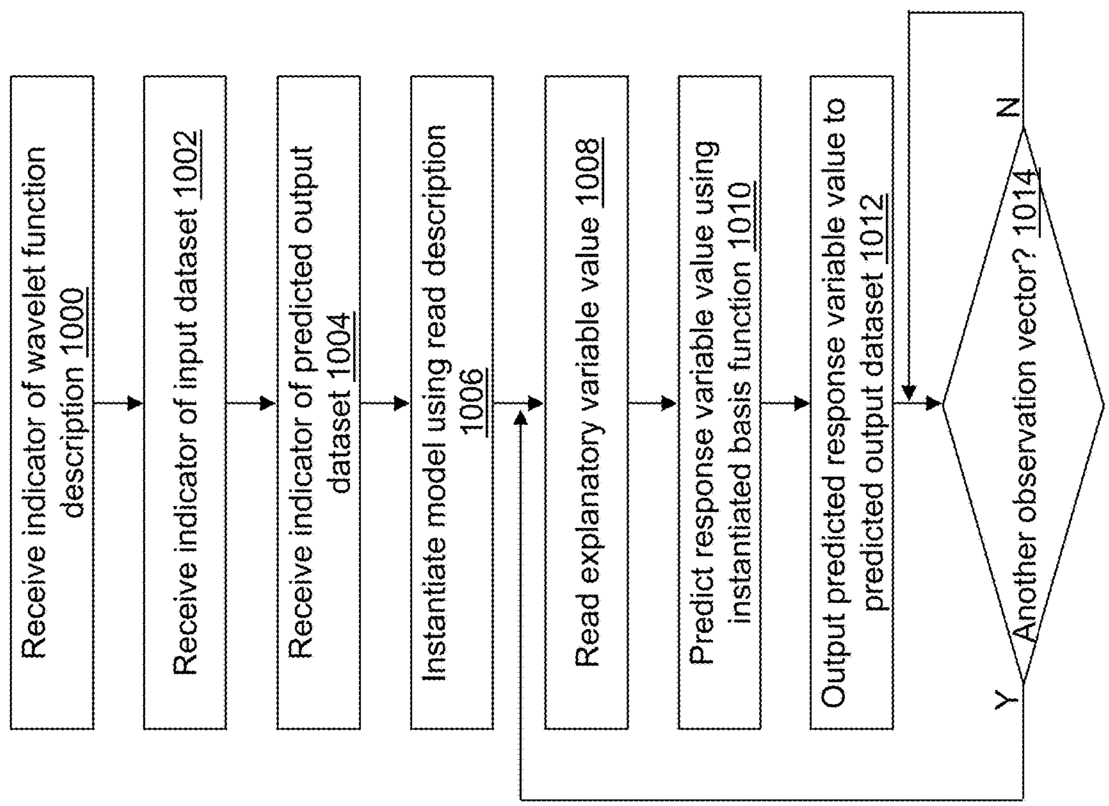
FIG. 10 depicts a flow diagram illustrating examples of operations performed by the prediction device of FIG. 9 in accordance with an illustrative embodiment.

Referring to FIG. 10, example operations of prediction application 922 are described. Additional, fewer, or different operations may be performed depending on the embodiment of prediction application 922. The order of presentation of the operations of FIG. 10 is not intended to be limiting. Although some of the operational flows are presented in sequence, the various operations may be performed in various repetitions, concurrently (in parallel, for example, using threads and/or a distributed computing system), and/or in other orders than those that are illustrated.

In an operation 1000, a ninth indicator may be received that indicates wavelet function description 926. For example, the ninth indicator indicates a location and a name of wavelet function description 926. As an example, the ninth indicator may be received by prediction application 922 after selection from a user interface window or after entry by a user into a user interface window. In an alternative embodiment, wavelet function description 926 may not be selectable. For example, a most recently created wavelet function description may be used automatically.

In an operation 1002, a tenth indicator may be received that indicates input dataset 924. For example, the tenth indicator indicates a location and a name of input dataset 924. As an example, the tenth indicator may be received by prediction application 922 after selection from a user interface window or after entry by a user into a user interface window. In an alternative embodiment, input dataset 924 may not be selectable. For example, a most recently created dataset may be used automatically.

In an operation 1004, an eleventh indicator may be received that indicates predicted output dataset 928. For example, the eleventh indicator indicates a location and a name of predicted output dataset 928. As an example, the eleventh indicator may be received by prediction application 922 after selection from a user interface window or after entry by a user into a user interface window. In an alternative embodiment, predicted output dataset 928 may not be selectable. For example, a default name and location for predicted output dataset 928 may be used automatically.

In an operation 1006, a wavelet function model is instantiated based on the wavelet function description read from wavelet function description 926. For example, the coefficients for the wavelet defined by the selected wavelet function with its associated zero or more hyperparameters stored in operation 254 is instantiated.

In an operation 1008, a value $x_i$ for the explanatory variable x is read from a next line of input dataset 924 or optionally is received from an ESPE.

In an operation 1010, a value $y_i$ for the response variable y is predicted using the instantiated wavelet function and the read/received value $x_i$.

In an operation 1012, the predicted value $y_i$ for the response variable y is output to predicted output dataset 928. The value $x_i$ and/or other values read from input dataset further may be output to predicted output dataset 928.

In an operation 1014, a determination is made concerning whether there is another observation vector to process. When there is another observation vector to process, processing continues in operation 1008. When there is not another observation vector to process, processing continues in operation 1014 to wait for receipt of another observation vector, for example, from an ESPE, or processing is done.

Figure 11:
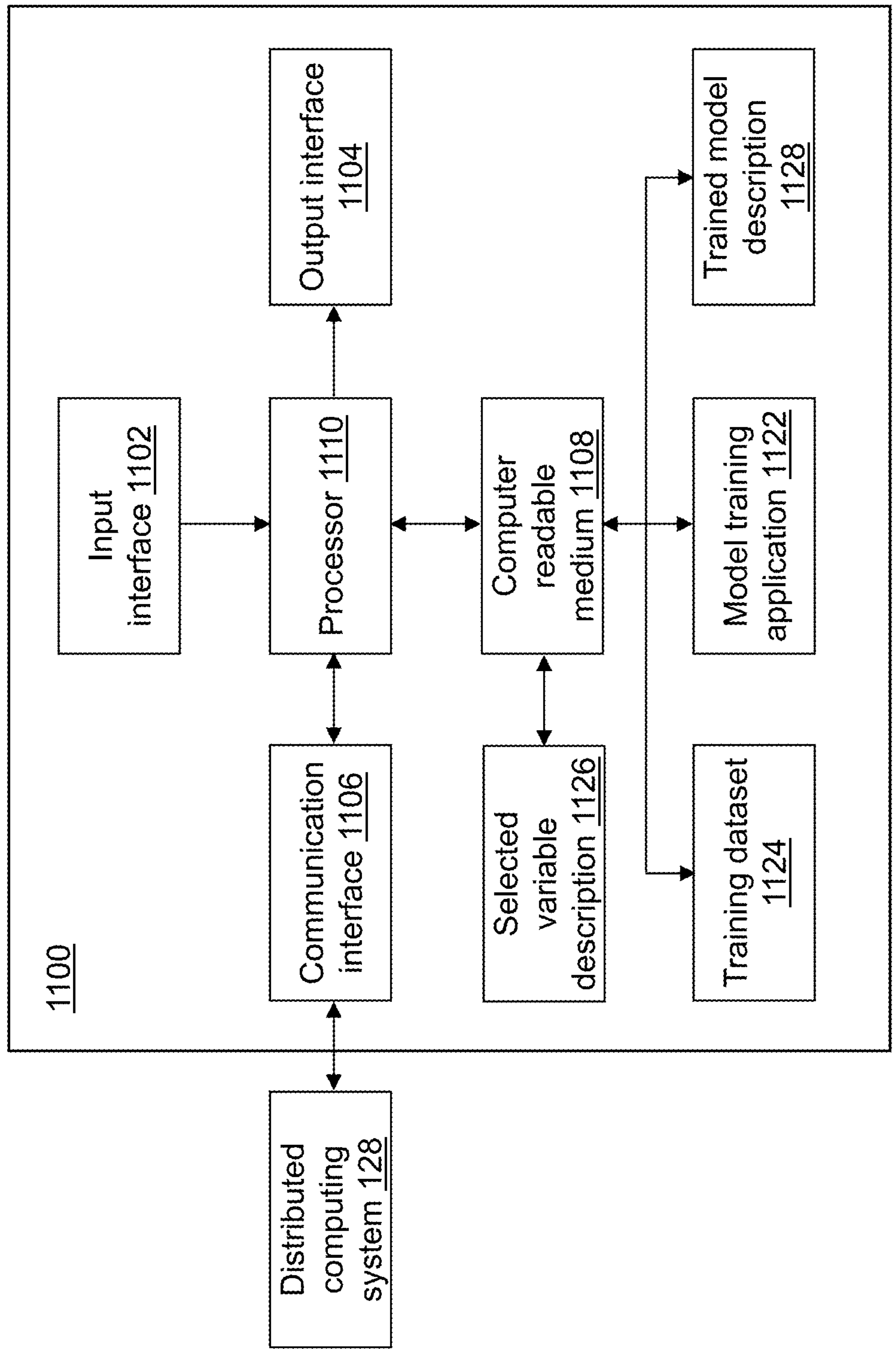
FIG. 11 depicts a block diagram of a model training device that uses variables identified as part of the model selection to train a model and predict a result in accordance with an illustrative embodiment.

Referring to FIG. 11, a block diagram of a model training device 1100 is shown in accordance with an illustrative embodiment. Model training device 1100 may include a third input interface 1102, a third output interface 1104, a third communication interface 1106, a third non-transitory computer-readable medium 1108, a third processor 1110, a model training application 1122, selected variable description 1126, training dataset 1124, and trained model description 1128. Selected variable description 1126 may be read or extracted from FDOE analysis description 126 as the features, including the factor variables, the explanatory variable x, and the response variable y, selected to train a model based on FDOE dataset 124. Training dataset may be FDOE dataset 124 in an illustrative embodiment. Fewer, different, and/or additional components may be incorporated into model training device 1100. Model training device 1100 and model selection device 100 may be the same or different devices.

Third input interface 1102 provides the same or similar functionality as that described with reference to input interface 102 of model selection device 100 though referring to model training device 1100. Third output interface 1104 provides the same or similar functionality as that described with reference to output interface 104 of model selection device 100 though referring to model training device 1100. Third communication interface 1106 provides the same or similar functionality as that described with reference to communication interface 106 of model selection device 100 though referring to model training device 1100. Data and messages may be transferred between model training device 1100 and distributed computing system 128 using third communication interface 1106. Third computer-readable medium 1108 provides the same or similar functionality as that described with reference to computer-readable medium 108 of model selection device 100 though referring to model training device 1100. Third processor 1110 provides the same or similar functionality as that described with reference to processor 110 of model selection device 100 though referring to model training device 1100.

Model training application 1122 performs operations associated with training a model to predict values for response variable y using selected variable description 1126 based on values for the explanatory variable x stored in training dataset 1124. The parameters that describe the trained model may be stored in trained model description 1128. Dependent on the type of data stored in FDOE dataset 124 and training dataset 1124, the trained model may identify anomalies as part of process control, for example, of a manufacturing process, for machine condition monitoring, for example, an electro-cardiogram device, etc. Some or all of the operations described herein may be embodied in model training application 1122. The operations may be implemented using hardware, firmware, software, or any combination of these methods.

Referring to the example embodiment of FIG. 11, model training application 1122 is implemented in software (comprised of computer-readable and/or computer-executable instructions) stored in third computer-readable medium 1108 and accessible by third processor 1110 for execution of the instructions that embody the operations of model training application 1122. Model training application 1122 may be written using one or more programming languages, assembly languages, scripting languages, etc. Model training application 1122 may be integrated with other analytic tools. For example, model training application 1122 may be implemented using or integrated with one or more SAS software tools such as JMP®, Base SAS, SAS/STAT®, of SAS® Enterprise Miner™ SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, all of which are developed and provided by SAS Institute Inc. of Cary, N.C., USA. One or more operations of model training application 1122 further may be performed by an ESPE. Model training application 1122 and model selection application 122 further may be integrated applications. Model training application 1122 may be implemented as a Web application.

FDOE dataset 124 and training dataset 1124 may be generated, stored, and accessed using the same or different mechanisms. Similar to FDOE dataset 124, training dataset 1124 may include a plurality of rows and a plurality of columns with the plurality of rows referred to as observation vectors or records, and the columns referred to as variables that are associated with an observation. Training dataset 1124 may be transposed.

Similar to FDOE dataset 124, training dataset 1124 may be stored on third computer-readable medium 1108 or on one or more computer-readable media of distributed computing system 128 and accessed by model training device 1100 using second communication interface 1106. The data stored in training dataset 1124 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. The data stored in training dataset 1124 may be captured at different time points periodically, intermittently, when an event occurs, etc. One or more columns may include a time value. Similar to FDOE dataset 124, data stored in training dataset 1124 may be generated as part of the IoT, and some or all data may be pre- or post-processed by an ESPE.

Similar to FDOE dataset 124, training dataset 1124 may be stored in various compressed formats such as a coordinate format, a compressed sparse column format, a compressed sparse row format, etc. Training dataset 1124 further may be stored using various structures as known to those skilled in the art including a file system, a relational database, a system of tables, a structured query language database, etc. on model selection device 100, on model training device 1100, and/or on distributed computing system 128. Model training device 1100 and/or distributed computing system 128 may coordinate access to training dataset 1124 that is distributed across a plurality of computing devices. For example, training dataset 1124 may be stored in a cube distributed across a grid of computers as understood by a person of skill in the art. As another example, training dataset 1124 may be stored in a multi-node Hadoop® cluster. As another example, training dataset 1124 may be stored in a cloud of computers and accessed using cloud computing technologies, as understood by a person of skill in the art. The SAS® LASR™ Analytic Server and/or SAS® Viya™ may be used as an analytic platform to enable multiple users to concurrently access data stored in training dataset 1124.

Figure 12:
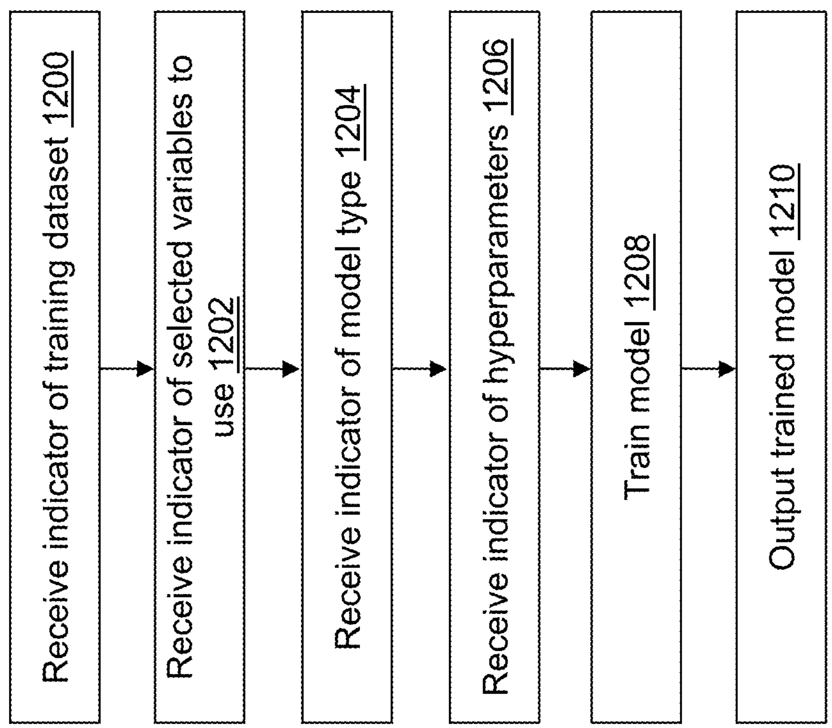
FIG. 12 depicts a flow diagram illustrating examples of operations performed by the model training device of FIG. 11 in accordance with an illustrative embodiment.

Referring to FIG. 12, example operations of model training application 1122 are described. Additional, fewer, or different operations may be performed depending on the embodiment of model training application 1122. The order of presentation of the operations of FIG. 12 is not intended to be limiting. Although some of the operational flows are presented in sequence, the various operations may be performed in various repetitions, concurrently (in parallel, for example, using threads and/or a distributed computing system), and/or in other orders than those that are illustrated.

In an operation 1200, an eleventh indicator may be received that indicates training dataset 1124. For example, the eleventh indicator indicates a location and a name of training dataset 1124. As an example, the eleventh indicator may be received by model training application 1122 after selection from a user interface window or after entry by a user into a user interface window. In an alternative embodiment, training dataset 1124 may not be selectable. For example, a most recently created dataset may be used automatically. Training dataset 1124 includes a number of observation vectors N.

In an operation 1202, a twelfth indicator may be received that indicates a plurality of variables or features read from selected variable description 1126 that are to be included in training a predictive model using training dataset 1124. For example, the twelfth indicator may indicate a plurality of column numbers or a plurality of column names. As another option, all of the columns may be used by default. Each observation vector $x_i$, i=1, . . . , m read from training dataset 1124 may include a value for each variable of the plurality of variables to define m dimensions or features. Training dataset 1124 includes a set of observation vectors $x=[x_{j,i}]=1, \ldots, m, j=1, \ldots, N$.

In an operation 1204, a thirteenth indicator indicates a model type. For example, the thirteenth indicator indicates a name of a model type that performs prediction and/or classification. The thirteenth indicator may be received by model training application 1122 from a user interface window or after entry by a user into a user interface window. A default value for the model type may further be stored, for example, in third computer-readable medium 1108. As an example, a model type may be selected from "SVM", "K-Cluster", "Neural Network", "Logistic Regression", "Forest", "Gradient Boosting", "Decision Tree", "Factorization Machine", etc. The model type indicated by "SVM" may refer to a support vector machine (SVM) model type. The model type indicated by "K-Cluster" may refer to a k-means clustering model type. The model type indicated by "Neural Network" may refer to a neural network model type. The model type indicated by "Logistic Regression" may refer to a logistic regression model type. The model type indicated by "Forest" may refer to a random forest model type. The model type indicated by "Gradient Boosting" may refer to a gradient boosting model type. The model type indicated by "Decision Tree" may refer to a decision tree model type. The model type indicated by "Factorization Machine" may refer to a factorization machine model type. For example, a default model type may be indicated by "Gradient Boosting". Of course, the model type may be labeled or selected in a variety of different manners by the user as understood by a person of skill in the art. In an alternative embodiment, the model type may not be selectable, and a single model type is implemented by model training application 1122. For example, the model type indicated as "Gradient Boosting" may be used by default or without allowing a selection.

In an operation 1206, a fourteenth indicator of one or more hyperparameters to use for training and validating the indicated model type and/or specified values for an automatic tuning method (autotune option) are received.

In an operation 1208, a model is trained using the values of the selected variables indicated in operation 1202 for each observation vector read from training dataset 1124 indicated in operation 1200 based on the model type indicated in operation 1204, and the hyperparameters indicated in operation 1206. For example, the model may be trained and validated using another application that is distinct from model training application 1122 or is integrated with model training application 1122. Model training application 1122 performs operations associated with defining trained model description 1128. For illustration, a TREESPLIT Procedure included in SAS® Visual Data Mining and Machine Learning 8.1: Statistical Procedures developed and provided by SAS Institute Inc. of Cary, N.C., USA may be used for a decision tree model type; a FACTMAC procedure included in SAS® Visual Data Mining and Machine Learning 8.1: Data Mining and Machine Learning Procedures developed and provided by SAS Institute Inc. of Cary, N.C., USA may be used for a factorization machine model type; a FOREST procedure included in SAS® Visual Data Mining and Machine Learning 8.1: Data Mining and Machine Learning Procedures developed and provided by SAS Institute Inc. of Cary, N.C., USA may be used for a random forest model type; a GRADBOOST procedure included in SAS® Visual Data Mining and Machine Learning 8.1: Data Mining and Machine Learning Procedures developed and provided by SAS Institute Inc. of Cary, N.C., USA may be used for a gradient boosting model type; a NNET procedure included in SAS® Visual Data Mining and Machine Learning 8.1: Data Mining and Machine Learning Procedures developed and provided by SAS Institute Inc. of Cary, N.C., USA may be used for a gradient boosting model type; a SVMACHINE procedure included in SAS® Visual Data Mining and Machine Learning 8.1: Data Mining and Machine Learning Procedures developed and provided by SAS Institute Inc. of Cary, N.C., USA may be used for a support vector machine model type; a HPLOGISTIC procedure included in SAS/STAT® 15.1 developed and provided by SAS Institute Inc. of Cary, N.C., USA may be used for a logistic regression model type; a KCLUS procedure included in SAS® Visual Data Mining and Machine Learning 8.1: Statistical Procedures developed and provided by SAS Institute Inc. of Cary, N.C., USA may be used for a k-means clustering model type; etc.

In an operation 1210, the data that describes the trained model is stored in trained model description 1128. For illustration, the trained model may be stored using the ASTORE procedure provided by SAS® Visual Data Mining and Machine Learning software. The trained model can then be used by prediction application 922 to predict a response variable value though by instantiating the trained model using trained model description 1128 instead of basis function description 926.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:

read a dataset that includes a plurality of observation vectors defined for each value of a plurality of values of a group variable, wherein each observation vector of each plurality of observation vectors includes an explanatory variable value of an explanatory variable and a response variable value of a response variable;

(A) define a response variable vector for each value of the plurality of values of the group variable and an explanatory variable vector from the read dataset, wherein the explanatory variable vector is common to each value of the plurality of values of the group variable, wherein a number of values included in the explanatory variable vector is greater than or equal to a maximum number of observation vectors that are included in the plurality of observation vectors defined for each value of the plurality of values of the group variable, wherein a number of values included in the response variable vector is equal to a number of values included in the explanatory variable vector;

(B) fit a wavelet function to the explanatory variable vector paired with the response variable vector defined for each value of the plurality of values of the group variable, wherein each fit wavelet function defines a plurality of coefficients for each value of the plurality of values of the group variable, wherein the plurality of coefficients describes a respective response variable vector based on the explanatory variable vector;

(C) present a curve in a graph for each value of the plurality of values of the group variable, wherein the graph is included within a first sub-window of a first window of a display, wherein each curve is defined by the plurality of coefficients of an associated fit wavelet function;

(D) receive an indicator of a request to perform functional analysis using the plurality of coefficients for each value of the plurality of values of the group variable based on a predefined factor variable, wherein the indicator is received in association with the first window of the display, wherein each observation vector of each plurality of observation vectors further includes a factor variable value of the predefined factor variable;

(E) train a model using the plurality of coefficients for each value of the plurality of values of the group variable and the factor variable value associated with each observation vector of each plurality of observation vectors as a model effect; and (F) present trained model results from the trained model within a third sub-window of the first window of the display.

2. The non-transitory computer-readable medium of claim 1, wherein a selector associated with the first window of the display supports a user selection of a type of the wavelet function.

3. The non-transitory computer-readable medium of claim 2, wherein the type of the wavelet function is selected from the group consisting of a Haar wavelet function, a Meyer wavelet function, a Daubechies wavelet function, a symlet wavelet function, a coiflet wavelet function, and a Shannon wavelet function.

4. The non-transitory computer-readable medium of claim 3, wherein a second selector associated with the first window of the display supports a second user selection of one or more hyperparameters of the selected type of the wavelet function.

5. The non-transitory computer-readable medium of claim 1, wherein a selector associated with the first window of the display provides a user selection of a type of model to train in (E).

6. The non-transitory computer-readable medium of claim 5, wherein the type of model to train is selected from the group consisting of a generalized regression model, a neural network model, a decision tree model, and a gradient boosting tree model.

7. The non-transitory computer-readable medium of claim 1, wherein, after (C), a selector associated with the first window of the display supports a user modification of the wavelet function, wherein (A) through (C) is automatically repeated using the user modification of the wavelet function.

8. The non-transitory computer-readable medium of claim 1, wherein, after (F), a selector associated with the first window of the display supports a user modification of a type of model to train in (E), wherein (E) through (F) is automatically repeated with the user modification of the type of model to train.

9. The non-transitory computer-readable medium of claim 1, wherein, after (F), a selector associated with the first window of the display supports a user modification of a current factor variable value, wherein (E) through (F) is automatically repeated with the user modification of the current factor variable value.

10. The non-transitory computer-readable medium of claim 1, wherein, after (F), a selector associated with the first window of the display supports a user modification of a selected number of active effects value, wherein (E) through (F) is automatically repeated with the user modification of the selected number of active effects value.

11. The non-transitory computer-readable medium of claim 1, wherein each observation vector of each plurality of observation vectors further includes a factor variable value for each of a plurality of predefined factor variables, wherein the predefined factor variable is one of the plurality of predefined factor variables.

12. The non-transitory computer-readable medium of claim 11, wherein, after (F), a selector associated with the first window of the display supports a user modification of a current factor variable value for one of the plurality of predefined factor variables, wherein (E) through (F) is automatically repeated with the user modification of the current factor variable value.

13. The non-transitory computer-readable medium of claim 12, wherein, after (E) through (F) is automatically repeated with the user modification of the current factor variable value, the computer-readable instructions further cause the computing device to, output an indicator of a factor variable selected from the plurality of predefined factor variables to model the explanatory variable value.

14. The non-transitory computer-readable medium of claim 13, wherein the computer-readable instructions further cause the computing device to:

train a model using observation vector values associated with the explanatory variable, the response variable, and the selected factor variable;

read a second explanatory variable value from a scoring dataset;

compute a new response variable value using the trained model; and output the computed new response variable value.

15. The non-transitory computer-readable medium of claim 1, wherein the computer-readable instructions further cause the computing device to:

read a second explanatory variable value from a scoring dataset;

compute a new response variable value using parameters that describe the trained model with the read, second explanatory variable value; and output the computed new response variable value.

16. The non-transitory computer-readable medium of claim 1, wherein before (C) and after (B), the computer-readable instructions further cause the computing device to:

(G) compute a fit criterion value that measures a closeness of a fit by the plurality of coefficients to the explanatory variable vector paired with the response variable vector defined for each value of the plurality of values of the group variable, wherein the fit criterion value is defined for each value of the plurality of values of the group variable; and (H) compute an average criterion fit value from the fit criterion value defined for each value of the plurality of values of the group variable.

17. The non-transitory computer-readable medium of claim 16, wherein before (C) and after (H), the computer-readable instructions further cause the computing device to:

(I) repeat (B), (G), and (H) with a different type of wavelet function as the wavelet function; and (J) select a best fit wavelet function based on an extremum value of the average criterion fit value, wherein the curve for each value of the plurality of values of the group variable presented in (C) is defined by the plurality of coefficients for each value of the plurality of values of the group variable of the selected best fit wavelet function.

18. The non-transitory computer-readable medium of claim 17, wherein before (C) and after (J), the computer-readable instructions further cause the computing device to:

(K) present a criterion fit graph within the first sub-window of the first window of the display, wherein the criterion fit graph includes a criterion fit curve of the average criterion fit value as a function of a unique model number associated with each wavelet function fit in (B).

19. The non-transitory computer-readable medium of claim 18, wherein, after (K), a selector associated with the presented criterion fit graph supports a user modification of the wavelet function presented in (C).

20. The non-transitory computer-readable medium of claim 18, wherein before (C) and after (J), the computer-readable instructions further cause the computing device to:

(K) present a criterion fit table, wherein the criterion fit table includes the average criterion fit value and a unique model number associated with each wavelet function fit in (B).

21. The non-transitory computer-readable medium of claim 20, wherein, after (K), a selector associated with the presented criterion fit table supports a user modification of the wavelet function presented in (C).

22. The non-transitory computer-readable medium of claim 17, wherein before (C) and after (J), the computer-readable instructions further cause the computing device to:

(K) present a criterion fit table, wherein the criterion fit table includes the average criterion fit value and a unique model number associated with each wavelet function fit in (B).

23. The non-transitory computer-readable medium of claim 22, wherein, after (K), a selector associated with the presented criterion fit table supports a user modification of the wavelet function presented in (C).

24. The non-transitory computer-readable medium of claim 16, wherein before (C) and after (H), the computer-readable instructions further cause the computing device to:

(I) repeat (B), (G), and (H) with a different hyperparameter value for the wavelet function; and (J) select a best fit wavelet function based on an extremum value of the average criterion fit value, wherein the curve for each value of the plurality of values of the group variable presented in (C) is defined by the plurality of coefficients for each value of the plurality of values of the group variable of the selected best fit wavelet function.

25. The non-transitory computer-readable medium of claim 1, wherein the number of values included in the explanatory variable vector is defined using $n=2^k$, where n is the number of values included in the explanatory variable vector, $k=\text{roundup}(\log_2(n_x))$, roundup determines an integer value rounded up to a next whole integer value, and $n_x$ is a number of the plurality of observation vectors defined for each value of the plurality of values of a group variable having the largest number of observations.

26. The non-transitory computer-readable medium of claim 1, wherein the number of values included in the explanatory variable vector is defined using $n=2^k$, where n is the number of values included in the explanatory variable vector, $k=\text{rounddown}(\log_2(n_x))$, rounddown determines an integer value rounded down to a next whole integer value, and $n_x$ is a number of the plurality of observation vectors defined for each value of the plurality of values of a group variable having the largest number of observations.

27. The non-transitory computer-readable medium of claim 1, wherein the number of values included in the explanatory variable vector is a number of the plurality of observation vectors defined for each value of the plurality of values of a group variable having the largest number of observations.

28. The non-transitory computer-readable medium of claim 1, wherein defining the response variable vector for each value of the plurality of values of the group variable and the explanatory variable vector comprises:

adding zero or more explanatory variable values to the plurality of observation vectors defined for the value of the group variable having the largest number of observations until a number of the plurality of observation vectors defined for the value of the group variable having the largest number of observations is the number of values to define the explanatory variable vector; and define the response variable vector for each value of the plurality of values of the group variable using interpolation between values of the response variable as a function of successive values included in the defined explanatory variable vector.

29. A computing device comprising:

a processor; and a non-transitory computer-readable medium operably coupled to the processor, the computer-readable medium having computer-readable instructions stored thereon that, when executed by the processor, cause the computing device to read a dataset that includes a plurality of observation vectors defined for each value of a plurality of values of a group variable, wherein each observation vector of each plurality of observation vectors includes an explanatory variable value of an explanatory variable and a response variable value of a response variable;

(A) define a response variable vector for each value of the plurality of values of the group variable and an explanatory variable vector from the read dataset, wherein the explanatory variable vector is common to each value of the plurality of values of the group variable, wherein a number of values included in the explanatory variable vector is greater than or equal to a maximum number of observation vectors that are included in the plurality of observation vectors defined for each value of the plurality of values of the group variable, wherein a number of values included in the response variable vector is equal to a number of values included in the explanatory variable vector;

(B) fit a wavelet function to the explanatory variable vector paired with the response variable vector defined for each value of the plurality of values of the group variable, wherein each fit wavelet function defines a plurality of coefficients for each value of the plurality of values of the group variable, wherein the plurality of coefficients describes a respective response variable vector based on the explanatory variable vector;

(C) present a curve in a graph for each value of the plurality of values of the group variable, wherein the graph is included within a first sub-window of a first window of a display, wherein each curve is defined by the plurality of coefficients of an associated fit wavelet function;

(D) receive an indicator of a request to perform functional analysis using the plurality of coefficients for each value of the plurality of values of the group variable based on a predefined factor variable, wherein the indicator is received in association with the first window of the display, wherein each observation vector of each plurality of observation vectors further includes a factor variable value of the predefined factor variable;

(E) train a model using the plurality of coefficients for each value of the plurality of values of the group variable and the factor variable value associated with each observation vector of each plurality of observation vectors as a model effect; and (F) present trained model results from the trained model within a third sub-window of the first window of the display.

30. A method of providing interactive model selection, the method comprising:

reading, by a computing device, a dataset that includes a plurality of observation vectors defined for each value of a plurality of values of a group variable, wherein each observation vector of each plurality of observation vectors includes an explanatory variable value of an explanatory variable and a response variable value of a response variable;

(A) defining, by the computing device, a response variable vector for each value of the plurality of values of the group variable and an explanatory variable vector from the read dataset, wherein the explanatory variable vector is common to each value of the plurality of values of the group variable, wherein a number of values included in the explanatory variable vector is greater than or equal to a maximum number of observation vectors that are included in the plurality of observation vectors defined for each value of the plurality of values of the group variable, wherein a number of values included in the response variable vector is equal to a number of values included in the explanatory variable vector;

(B) fitting, by the computing device, a wavelet function to the explanatory variable vector paired with the response variable vector defined for each value of the plurality of values of the group variable, wherein each fit wavelet function defines a plurality of coefficients for each value of the plurality of values of the group variable, wherein the plurality of coefficients describes a respective response variable vector based on the explanatory variable vector;

(C) presenting, by the computing device, a curve in a graph for each value of the plurality of values of the group variable, wherein the graph is included within a first sub-window of a first window of a display, wherein each curve is defined by the plurality of coefficients of an associated fit wavelet function;

(D) receiving, by the computing device, an indicator of a request to perform functional analysis using the plurality of coefficients for each value of the plurality of values of the group variable based on a predefined factor variable, wherein the indicator is received in association with the first window of the display, wherein each observation vector of each plurality of observation vectors further includes a factor variable value of the predefined factor variable;

(E) training, by the computing device, a model using the plurality of coefficients for each value of the plurality of values of the group variable and the factor variable value associated with each observation vector of each plurality of observation vectors as a model effect; and (F) presenting, by the computing device, trained model results from the trained model within a third sub-window of the first window of the display.

* * * * *